(12) United States Patent
Onoe

(10) Patent No.: US 9,390,742 B2
(45) Date of Patent: Jul. 12, 2016

(54) HOLOGRAM RECORDING DEVICE AND HOLOGRAM RECORDING METHOD

(75) Inventor: Shinsuke Onoe, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 14/421,458

(22) PCT Filed: Aug. 31, 2012

(86) PCT No.: PCT/JP2012/072099
§ 371 (c)(1),
(2), (4) Date: Feb. 13, 2015

(87) PCT Pub. No.: WO2014/033895
PCT Pub. Date: Mar. 6, 2014

(65) Prior Publication Data
US 2015/0221331 A1    Aug. 6, 2015

(51) Int. Cl.
*G11B 7/0065* (2006.01)
*G03H 1/18* (2006.01)
*G11B 20/12* (2006.01)
*G11B 7/00* (2006.01)

(52) U.S. Cl.
CPC ............. *G11B 7/0065* (2013.01); *G03H 1/182* (2013.01); *G03H 2001/185* (2013.01); *G11B 2007/0009* (2013.01); *G11B 2020/1288* (2013.01)

(58) Field of Classification Search
None
See application file for complete search history.

(56) References Cited

U.S. PATENT DOCUMENTS

| 2008/0037397 A1 | 2/2008 | Waldman et al. |
| 2009/0040581 A1 | 2/2009 | Hori et al. |
| 2009/0296558 A1 | 12/2009 | Akahoshi |
| 2010/0202270 A1 | 8/2010 | Nagai et al. |

FOREIGN PATENT DOCUMENTS

| JP | 11-16374 A | 1/1999 |
| JP | 2006243241 | 9/2006 |
| JP | 2007519036 | 7/2007 |
| JP | 2009043369 | 2/2009 |
| JP | 2009289384 | 12/2009 |
| JP | 2010181760 | 8/2010 |

OTHER PUBLICATIONS

International Search Report in PCT/JP2012/072099, dated Mar. 19, 2013.
Japanese Office Action received in corresponding Japanese Application No. 2014-532666 dated Dec. 15, 2015.

*Primary Examiner* — Brian Butcher
(74) *Attorney, Agent, or Firm* — Mattingly & Malur, PC

(57) ABSTRACT

Appropriate recording with respect to a hologram recording medium is to be realized. After a region recording process of arranging holograms in which information is recorded at a predetermined interval in a first predetermined region of the hologram recording medium, and before a post-curing with respect to the first predetermined region is performed, signal light and reference light are applied onto a region different from the first predetermined region to perform information recording.

17 Claims, 17 Drawing Sheets

B COLUMNS

A ROWS

HOLOGRAM RECORDING DEVICE AND HOLOGRAM RECORDING METHOD

TECHNICAL FIELD

The present invention relates to a recording device and a recording method which use holography.

BACKGROUND ART

Recently, based on the Blu-ray disc (trademark) standard that uses a bluish-purple semiconductor laser, an optical disc having a recording capacity of about 50 GB has been commercialized as a general optical disc. In the near future, it is expected that an optical disc having a large capacity of 100 GB to 1 TB equivalent to the capacity of a hard disk drive (HDD) will be developed.

However, in order to realize such an extremely high density of capacity in the optical disc, a high densification technique based on a new method different from a high densification technique based on wavelength shortening and increasing of a numerical aperture (NA) of an objective lens is necessary.

With the progress of studies related to a next-generation storage technique, a hologram recording technique that records digital information using holography has attracted attention.

The hologram recording technique refers to a technique that records information on a recording medium by superimposing signal light having information of page data two-dimensionally modulated by a space light modulator with reference light inside the recording medium and by causing modulation of a refractive index in the recording medium by a fringe pattern generated at this time.

In reproduction of the information, the reference light used in the recording is applied onto the recording medium, so that the hologram recorded on the recording medium acts like a diffraction grating to generate diffraction light. The diffraction light includes the recorded signal light and phase information, and is reproduced as the same light.

The reproduced signal light is two-dimensionally detected at a high speed using a light detector such as a CMOS or a CCD. In this way, in the hologram recording technique, it is possible to instantly record the two-dimensional information on an optical recording medium by one hologram, and to reproduce the information. Further, it is possible to overlay plural pieces of page data in a certain part of a recording medium, and it is thus possible to achieve recording and reproduction of information with a large capacity at a high speed.

As the hologram recording technique, for example, there is PTL 1. PTL 1 discloses that "FIG. 5 is a graph illustrating a time response characteristic of diffraction efficiency with respect to a waiting time from the end of recording to post treatment (time up to the post treatment) in a typical hologram recording medium using a photopolymer. As shown herein, if the time up to the post treatment is short, sufficient diffraction efficiency cannot be obtained. Thus, it is possible to determine a time necessary for a monomer to be sufficiently diffused from a diffusion speed of the monomer detected as a state of the hologram recording medium to perform sufficient refractive index modulation as an ideal time up to the post treatment".

CITATION LIST

Patent Literature

PTL 1: JP-A-2006-243241
PTL 2: JP-T-2007-519036

SUMMARY OF INVENTION

Technical Problem

However, when information is recorded with respect to the hologram recording medium, it is desirable to reduce the recording time. However, as disclosed in PTL 1, the waiting time from the end of recording to the post treatment is necessary.

PTL 1 discloses that "if the recording in the entire region of the hologram recording medium is completed, the control computer 70 reads information about the waiting time to the post treatment from the memory 70b (step S13), waits until the waiting time elapses from the final recording completion, and performs the post treatment (step S14)". However, in this method, since it takes the waiting time, there is a problem in that the recording time when the information is recorded with respect to the hologram recording medium increases.

Further, PTL 2 discloses that "fixing of the hologram medium is performed at the same time as a data recording event performed in a region of the hologram medium different from the fixed region". Further, PTL 2 discloses that "the passed part of the reference beam is light-guided again to a part of the photosensitive medium for which the fixing is necessary by the optical system 107. An advantage of providing the optical system 107 is that it is not necessary that the region 35 fixed by the reference beam be adjacent to the region 34 that is recorded at the same time".

An object of the invention is to provide a hologram recording device and a hologram recording method capable of realizing appropriate recording with respect to a hologram recording medium.

Solution to Problem

The problems are solved by the inventions disclosed in the appended claims, for example.

Advantageous Effects of Invention

According to the invention, it is possible to realize appropriate recording with respect to a hologram recording medium.

DESCRIPTION OF EMBODIMENTS

Hereinafter, examples of the invention will be described with reference to the accompanying drawings.

Example 1

Figure 1:
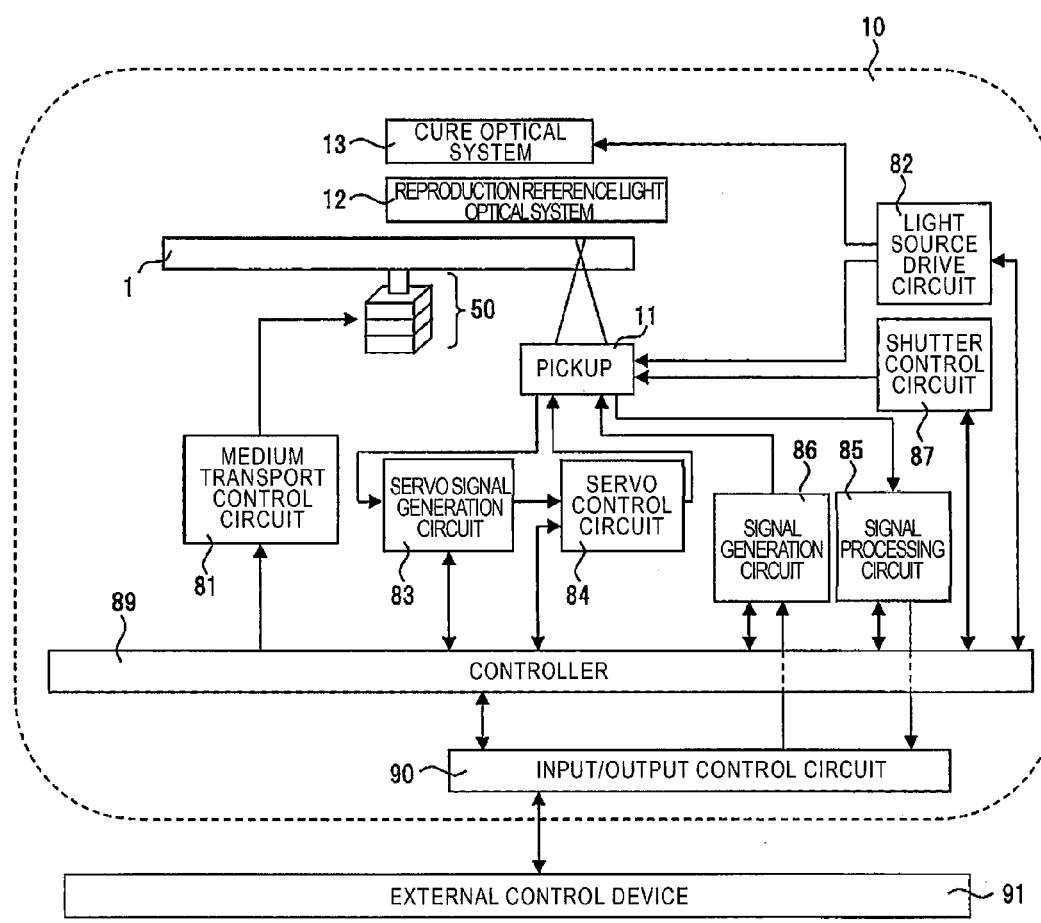
FIG. 1 is a block diagram illustrating a hologram recording/reproducing device according to Example 1.

Exemplary embodiments of the invention will be described with reference to the accompanying drawings. FIG. 1 is a block diagram illustrating a recording/reproducing device of a hologram recording medium, which records and/or reproduces digital information using holography.

A hologram recording/reproducing device 10 is connected to an external control device 91 through an input/output control circuit 90. When performing recording, the hologram recording/reproducing device 10 receives an information signal to be recorded from the external control device 91 through the input/output control circuit 90. When performing reproduction, the hologram recording/reproducing device 10 transmits a reproduced information signal to the external control device 91 through the input/output control circuit 90.

The hologram recording/reproducing device 10 includes a pickup 11, a reproduction reference light optical system 12, a cure optical system 13, and a medium transport unit 50, in which a hologram recording medium 1 is movable in parallel along a predetermined plane (plane parallel to a front face of the hologram recording medium 1) by the medium transport unit 50.

The medium transport unit 50 may be realized by a biaxial movable stage of X axis and Y axis, for example, and may be used for change of a recording position of the hologram recording medium 1, for example. When adjusting the recording position of the hologram recording medium 1, the medium transport unit 50 may be driven by a controller 89 through a medium transport control circuit 81 to control the recording position on the hologram recording medium 1. That is, the medium transport control circuit 81 and the medium transport unit 50 in the present example function as means for changing the recording position on the hologram recording medium 1.

The pickup 11 irradiates the hologram recording medium 1 with reference light and signal light to record digital information on a recording medium using holography. Here, an information signal to be recorded is sent to a space light modulator to be described later in the pickup 11 through a signal generation circuit 86 by the controller 89, and the signal light is modulated by the space light modulator.

When reproducing the information recorded in the hologram recording medium 1, a light wave for allowing the reference light emitted from the pickup 11 to enter the hologram recording medium 1 in a direction opposite to a direction thereof in recording is generated by the reproduction reference light optical system 12. Reproduction light reproduced by the reference light for reproduction is detected by a photo detector to be described later in the pickup 11, so that a signal is reproduced by a signal processing circuit 85.

An irradiation time of the reference light and the signal light applied onto the hologram recording medium 1 may be adjusted by controlling opening and closing times of a shutter in the pickup 11 by the controller 89 through a shutter control circuit 87.

The cure optical system 13 generates a light beam used for pre-cure and post-cure of the hologram recording medium 1. The pre-cure refers to a pre-process of, when recording information at a desired position on the hologram recording medium 1, irradiating the desired position with a predetermined light beam in advance before irradiating the desired position with the reference light and the signal light. The post-cure refers to a post-process of, after recording the information at the desired position on the hologram recording medium 1, irradiating the desired position with a predetermined light beam to make additional writing impossible. It is preferable that the light beam used for the pre-cure and post-cure be incoherent light, that is, light with low coherence.

A predetermined light source driving current is supplied to pickup 11, and light sources in the cure optical system 13 from a light source drive circuit 82, so that each light source may emit a light beam with a predetermined light intensity.

However, a recording technique that uses an angular multiplexing principle of holography tends to have an extremely small allowable error with respect to deviation of a reference light angle.

Accordingly, it is necessary to provide a mechanism that detects a deviation amount of the reference light angle in the pickup 11, to generate a signal for servo control using a servo signal generation circuit 83, and to provide a servo mechanism for correcting the deviation amount through a servo control circuit 84 in the hologram recording/reproducing device 10.

Further, the pickup 11 and the cure optical system 13 may be simplified by integrating some or all of optical system configurations thereof.

Figure 2:
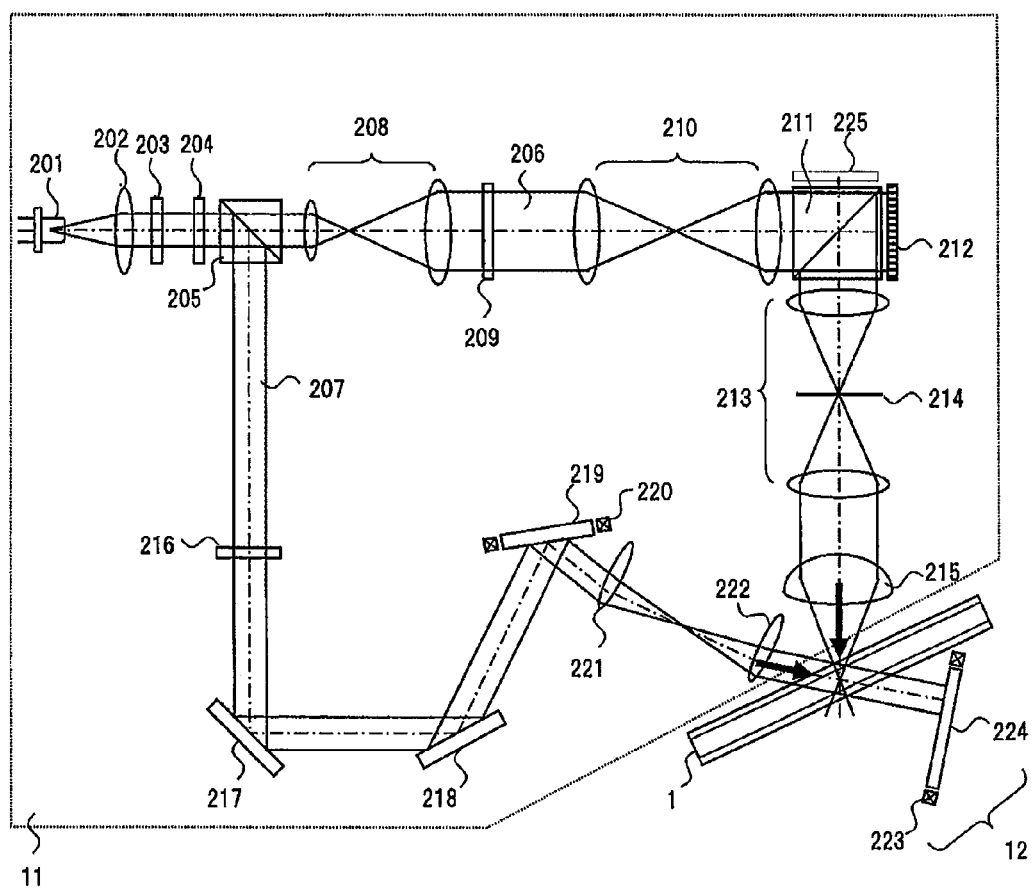
FIG. 2 is a diagram illustrating a recording principle of a hologram recording/reproducing device.

FIG. 2 shows a recording principle in an example of a basic optical system configuration of the pickup 11 and the reproduction reference light optical system 12 in the hologram recording/reproducing device 10. The reproduction reference light optical system 12 includes an actuator 223 and a galvano mirror 224.

A light beam emitted from a light source 201 passes through a collimator lens 202 and enters a shutter 203. When the shutter 203 is opened, the light beam passes through the shutter 203, is controlled in a polarization direction thereof so that a light intensity ratio of p polarization and s polarization becomes a desired ratio by an optical element 204 that includes a ½ wavelength plate, for example, and then enters a polarization beam splitter (PBS) prism 205.

The light beam passed through the PBS prism 205, functions as signal light 206, is enlarged in a light beam diameter thereof by a beam expander 208, passes through a phase mask 209, a relay lens 210, a PBS prism 211, and then enters a space light modulator 212.

Signal light to which information is added by the space light modulator 212 is reflected by the PBS prism 211, and propagates through a relay lens 213 and a space filter 214. Then, the signal light is condensed onto the hologram recording medium 1 by an objective lens 215.

On the other hand, the light beam reflected by the PBS prism 205 functions as reference light 207, is set in a predetermined polarization direction according to recording or reproduction by a polarization direction conversion element 216, and then, enters a galvano mirror 219 through a mirror 217 and a mirror 218. Since the galvano mirror 219 can adjust an angle thereof by an actuator 220, an incident angle of the reference light that enters the hologram recording medium 1 after passing through a lens 221 and a lens 222 may be set to a desired angle. In order to set the incident angle of the reference light, an element that converts a wave surface of the reference light may be used instead of the galvano mirror.

By allowing the signal light and the reference light to enter the hologram recording medium 1 and to overlap each other in this way, a fringe pattern is formed in the recording medium. As this pattern is written to the recording medium, information is recorded. Further, since the incident angle of the reference light that enters the hologram recording medium 1 can be changed by the galvano mirror 219, it is possible to perform recording by angle multiplexing.

Hereinafter, in a hologram in which recording is performed in the same region by changing the reference light angle, a hologram corresponding to each reference light angle is referred to as a page, and a set of pages that are angle-multiplexed in the same region is referred to as a book.

Figure 3:
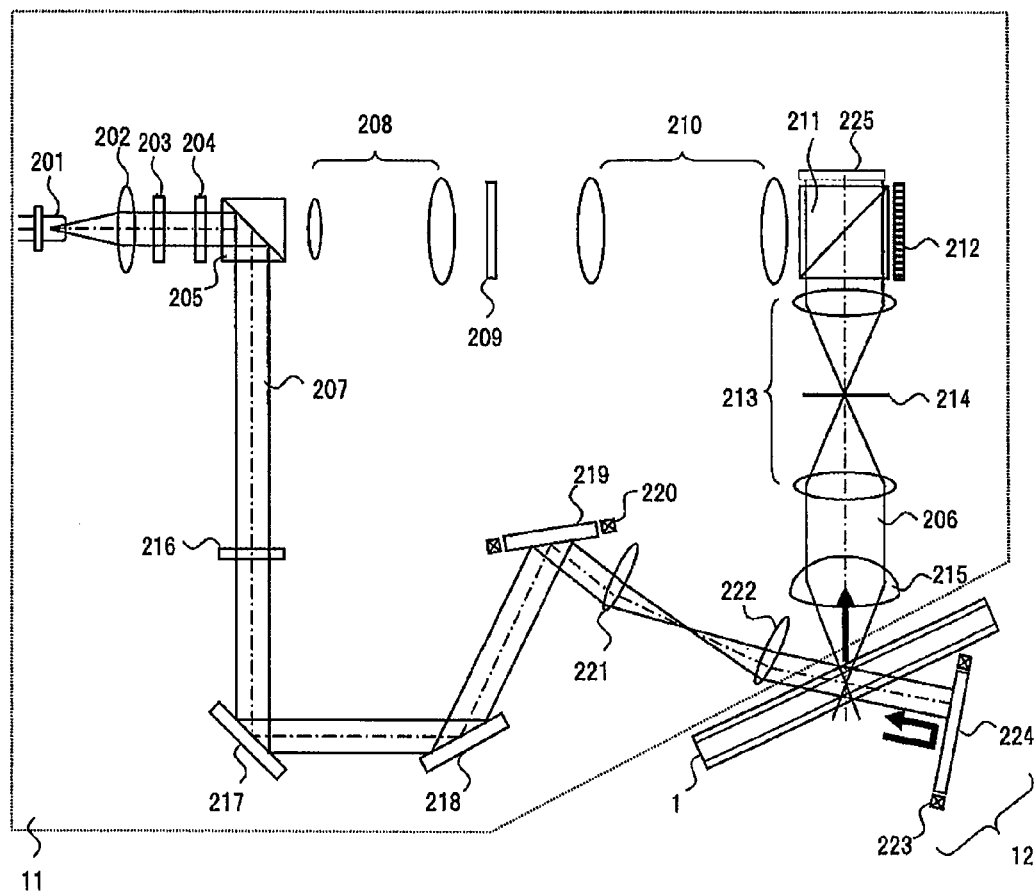
FIG. 3 is a diagram illustrating a reproduction principle of a hologram recording/reproducing device.

FIG. 3 shows a reproduction principle in an example of a basic optical system configuration of the pickup 11 and the reproduction reference light optical system 12 in the hologram recording/reproducing device 10. When reproducing the recorded information, as described above, by allowing the reference light to enter the hologram recording medium 1 and allowing the light beam passed through the hologram recording medium 1 to be reflected by the galvano mirror 224 capable of adjusting the angle thereof by the actuator 223, the reference light for reproduction is generated.

Reproduction light reproduced by the reference light for reproduction propagates through the objective lens 215, the relay lens 213, and the space filter 214. Then, the reproduction light passes through the PBS prism 211 to enter a light detector 225, to thereby reproduce a recorded signal. As the light detector 225, for example, an imaging element such as a CMOS image sensor or a CCD image sensor may be used, but any element capable of reproducing page data may be used.

FIG. 4 shows an operation flow of recording and reproduction in the hologram recording/reproducing device 10. Here, a flow relating to recording and reproduction, particularly, using holography will be described. In this specification, a process from the time when the hologram recording medium 1 is inserted to the hologram recording/reproducing device 10 to the time when preparation of recording or reproduction is completed is referred to as a setup process. A process of recording information on the hologram recording medium 1 from a preparation completion state is referred to as a recording process, and a process of reproducing information recorded on the hologram recording medium 1 from the preparation completion state is referred to a reproduction process.

Figure 4A:
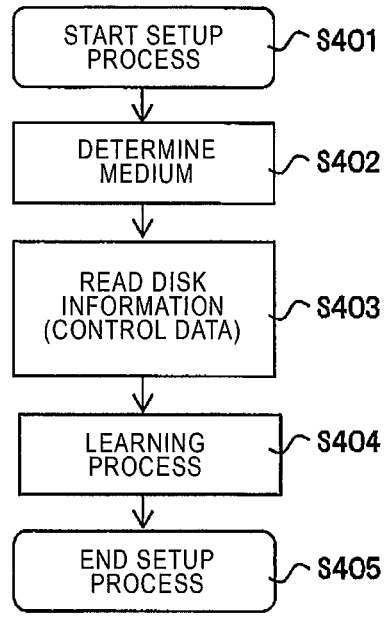
FIG. 4(a) is an operation flow until recording or reproduction preparation in a hologram recording/reproducing device is completed.
Figure 4B:
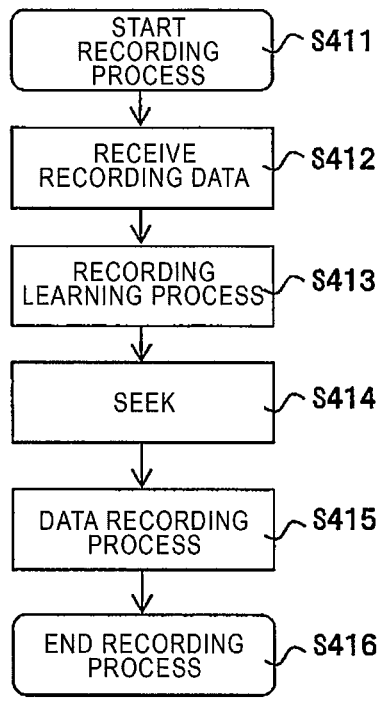
FIG. 4(b) is an operation flow of recording in a hologram recording/reproducing device.
Figure 4C:
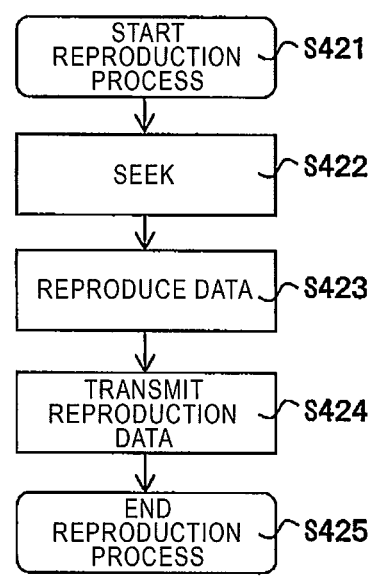
FIG. 4(c) is an operation flow of reproduction in a hologram recording/reproducing device.

FIG. 4(a) shows an operation flow of the setup process, FIG. 4(b) shows an operation flow of the recording process, and FIG. 4(c) shows an operation flow of the reproduction process.

As shown in FIG. 4(a), if the setup process starts (step S401), the hologram recording/reproducing device 10 performs medium determination of determining whether an inserted medium is a medium for recording or reproduction of digital information using holography, for example (step S402).

As a result of the medium determination, if it is determined that the inserted medium is the hologram recording medium 1 for recording or reproduction of the digital information using holography, the hologram recording/reproducing device 10 reads control data provided in the hologram recording medium 1 (step S403), to obtain information relating to the hologram recording medium 1 or information relating to various setting conditions during recording or reproduction, for example.

After reading the control data, the hologram recording/reproducing device 10 performs various adjustments based on the control data, or a learning process (step S404) relating to the pickup 11. Thus, the hologram recording/reproducing device 10 completes the recording or reproduction preparation to terminate the setup process (step S405).

Next, the operation flow from the preparation completion state to the time when information is recorded will be described with reference to FIG. 4(b). If the recording process starts (step S411), the hologram recording/reproducing device 10 receives recording data (step S412), and transmits two-dimensional data based on the data to the space light modulator 212 in the pickup 11.

Then, the hologram recording/reproducing device 10 performs, for example, various recording learning processes such as power optimization of the light source 201 or optimization of an exposure time in the shutter 203 in advance as necessary so that high quality information can be recorded on the hologram recording medium 1 (step S413).

Thereafter, in a seek operation (step S414), the hologram recording/reproducing device 10 controls the medium transport unit 50 through the medium transport control circuit 81 to position the hologram recording medium 1 so that a predetermined position of the hologram recording medium 1 is irradiated with a light beam emitted from the pickup 11 and the cure optical system 13. When the hologram recording medium 1 has address information, the hologram recording/reproducing device 10 reproduces the address information to confirm whether the hologram recording medium 1 is positioned at a desired position. If the hologram recording medium 1 is not disposed at the desired position, the hologram recording/reproducing device 10 calculates a deviation amount from the desired position, and repeats the positioning operation again.

Then, the hologram recording/reproducing device 10 performs a data recording process of recording data to be recorded on the hologram recording medium 1 as a hologram (step S415). Details about the data recording process will be described later. If the data recording process is completed, the recording process is terminated (step S416). Here, the data may be verified as necessary.

The operation flow from the preparation completion state to the time when recorded information is reproduced will be described with reference to FIG. 4(c). If the reproduction process starts (step S421), in a seek operation (step S422), the hologram recording/reproducing device 10 first controls the medium transport control circuit 81 to position the hologram recording medium 1 so that a predetermined position of the hologram recording medium 1 is irradiated with a light beam emitted from the pickup 11 and the reproduction reference light optical system 12. When the hologram recording medium 1 has address information, the hologram recording/reproducing device 10 reproduces the address information to confirm whether the hologram recording medium 1 is positioned at a desired position. If the hologram recording medium 1 is not disposed at the desired position, the hologram recording/reproducing device 10 calculates a deviation amount from the predetermined position, and repeats the positioning operation again.

Then, the hologram recording/reproducing device 10 emits a reference light from the pickup 11, reads information recorded on the hologram recording medium 1 from the two-dimensional data detected by the light detector 225 (step S423), and transmits reproduction data (step S424). If the transmission of the reproduction data is completed, the reproduction process is terminated (step S425).

Figure 12A:
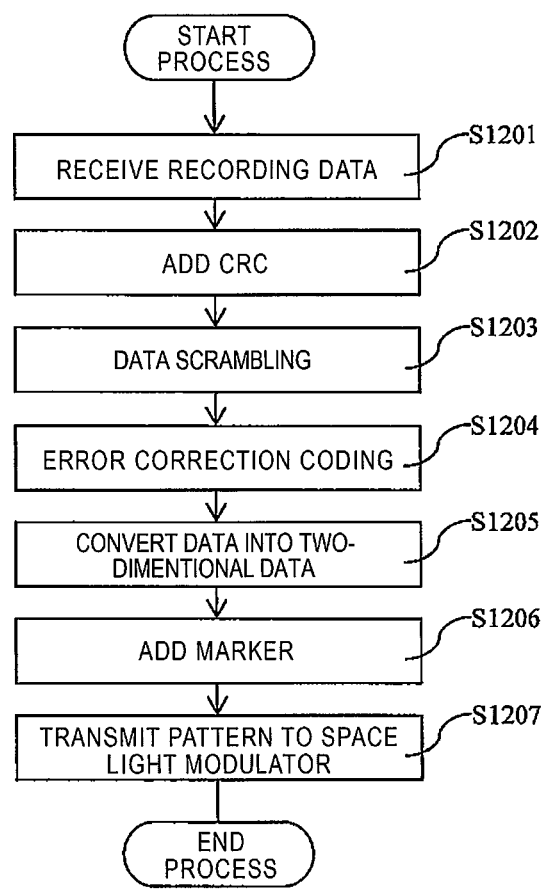
FIG. 12(a) is a diagram illustrating a data processing flow during recording.
Figure 12B:
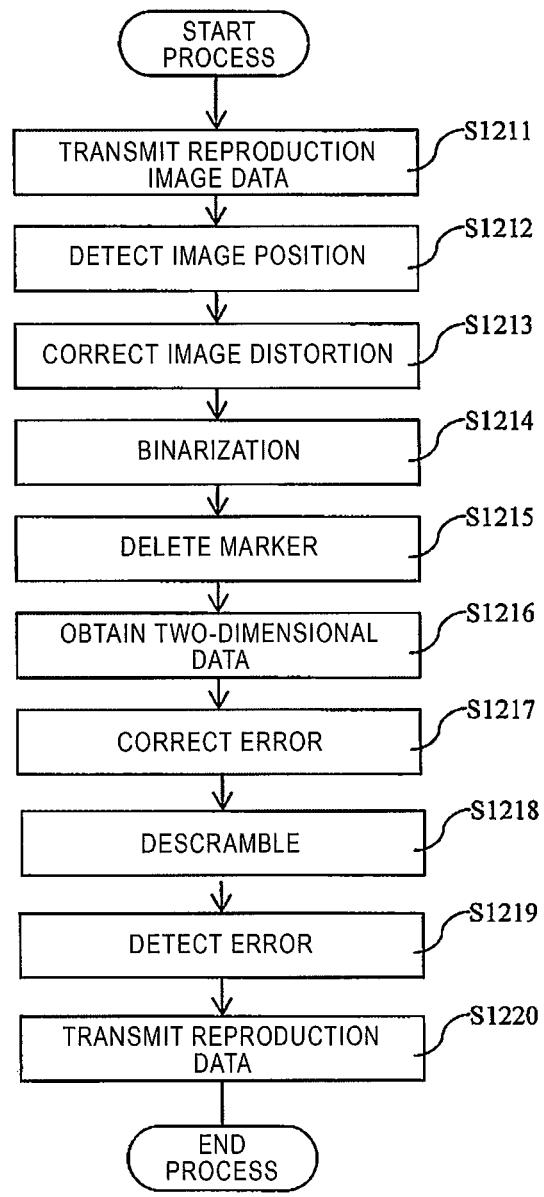
FIG. 12(b) is a diagram illustrating a data processing flow during reproduction.

FIG. 12 shows a data processing flow during recording and reproduction, in which FIG. 12(a) shows a recording data processing flow in the signal generation circuit 86 from the time when the recording data reception process S412 is performed in the input/output control circuit 90 to the time when data is converted into two-dimensional data on the space light modulator 212, and FIG. 12(b) shows a reproduction data processing flow in the signal processing circuit 85 from the time when the two-dimensional data is detected in the light detector 225 to the time when the reproduction data transmission process S424 is performed in the input/output control circuit 90.

The data processing during recording will be described with reference to FIG. 12(a). If recording data is received (step S1201), the hologram recording/reproducing device 10 divides the recording data into plural data strings, and converts each data string into a cyclic redundancy code (CRC) (step S1202) to perform error detection during reproduction. Then, the hologram recording/reproducing device 10 performs a scrambling process of adding a pseudo random number data string to the data string to prevent repetition of the same pattern while making the number of on-pixels and the number of off-pixels approximately equal to each other (step S1203). Then, the hologram recording/reproducing device 10 converts the data string into an error correction code such as Reed-Solomon codes to perform error correction during reproduction (step S1204). Then, the hologram recording/reproducing device 10 converts the data string into two-dimensional data of M×N, and repeats this process by one page to form two-dimensional data corresponding to one page (step S1205). Then, the hologram recording/reproducing device 10 adds a marker that serves as a reference in image position detection or image distortion correction during reproduction to the two-dimensional data configured as described above (step S1206), and transmits the data to the space light modulator 212 (step S1207).

Next, the data processing flow during reproduction will be described with reference to FIG. 12(b). Image data detected by the light detector 225 is transmitted to the signal processing circuit 85 (step S1211). The hologram recording/reproducing device 10 detects an image position using the marker included in the image data as the reference (step S1212), and corrects inclination, magnification and distortion of an image (step S1213). Then, the hologram recording/reproducing device 10 binarizes the data (step S1214), and deletes the marker (step S1215) to obtain two-dimensional data corresponding to one page (step S1216). The hologram recording/reproducing device 10 converts two-dimensional data obtained in this way into plural data strings, and then, performs an error correction process (step S1217) to delete a parity data string. Then, the hologram recording/reproducing device 10 performs a scramble releasing process (step S1218), performs an error detection process based on the CRC (step S1219) to delete a CRC parity, and then, transmits reproduction data through the input/output control circuit 90 (step S1220).

Figure 13:
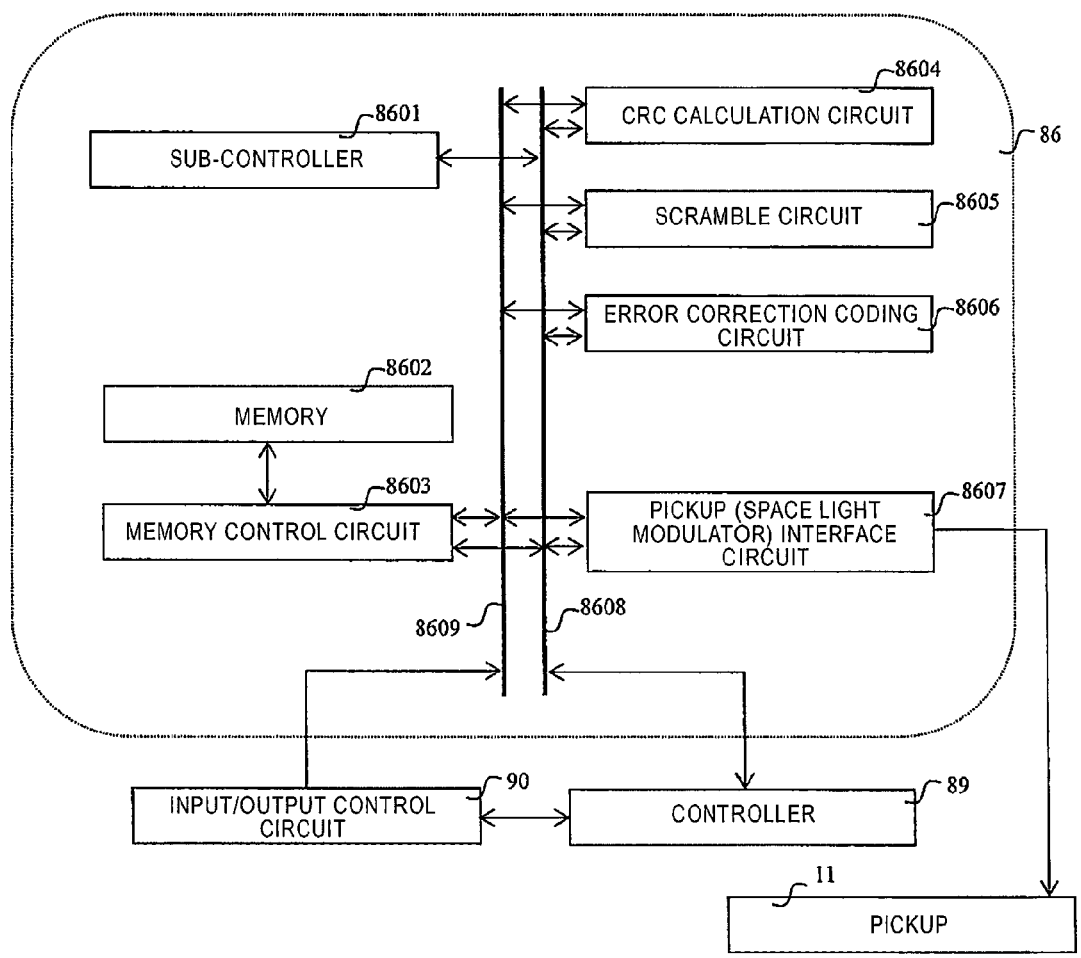
FIG. 13 is a block diagram illustrating a signal generating circuit in a hologram recording/reproducing device.

FIG. 13 is a block diagram of the signal generation circuit 86 of the hologram recording/reproducing device 10.

If input of the recording data to the input/output control circuit 90 starts, the input/output control circuit 90 notifies the controller 89 of the start of the input of the recording data. The controller 89 receives the notification, and instructs the signal generation circuit 86 to perform recording process of the data corresponding to one page input from the input/output control circuit 90. The processing instruction from the controller 89 is notified to a sub-controller 8601 in the signal generation circuit 86 through a control line 8608. The sub-controller 8601 that receives the notification controls respective signal processing circuits through the control line 8608 to operate the respective signal processing circuits in parallel. First, the sub-controller 8601 controls a memory control circuit 8603 to store the recording data input from the input/output control circuit 90 through a data line 8609 in a memory 8602. If the recording data stored in the memory 8602 reaches a predetermined amount, the sub-controller 8601 performs control for converting the recording data into the CRC by a CRC calculation circuit 8604. Then, the sub-controller 8601 performs control for performing the scrambling process of adding the pseudo random number data string to the CRC data by a scramble circuit 8605, and performs control for converting the data string into the error correction code to add the parity data string by an error correction coding circuit 8606. Finally, the sub-controller 8601 controls a pickup interface circuit 8607 to read the data converted into the error correction code from the memory 8602 in the arrangement order of the two-dimensional data on the space light modulator 212, adds the marker that serves as the reference during reproduction, and then, transmits the two-dimensional data to the space light modulator 212 in the pickup 11.

Figure 14:
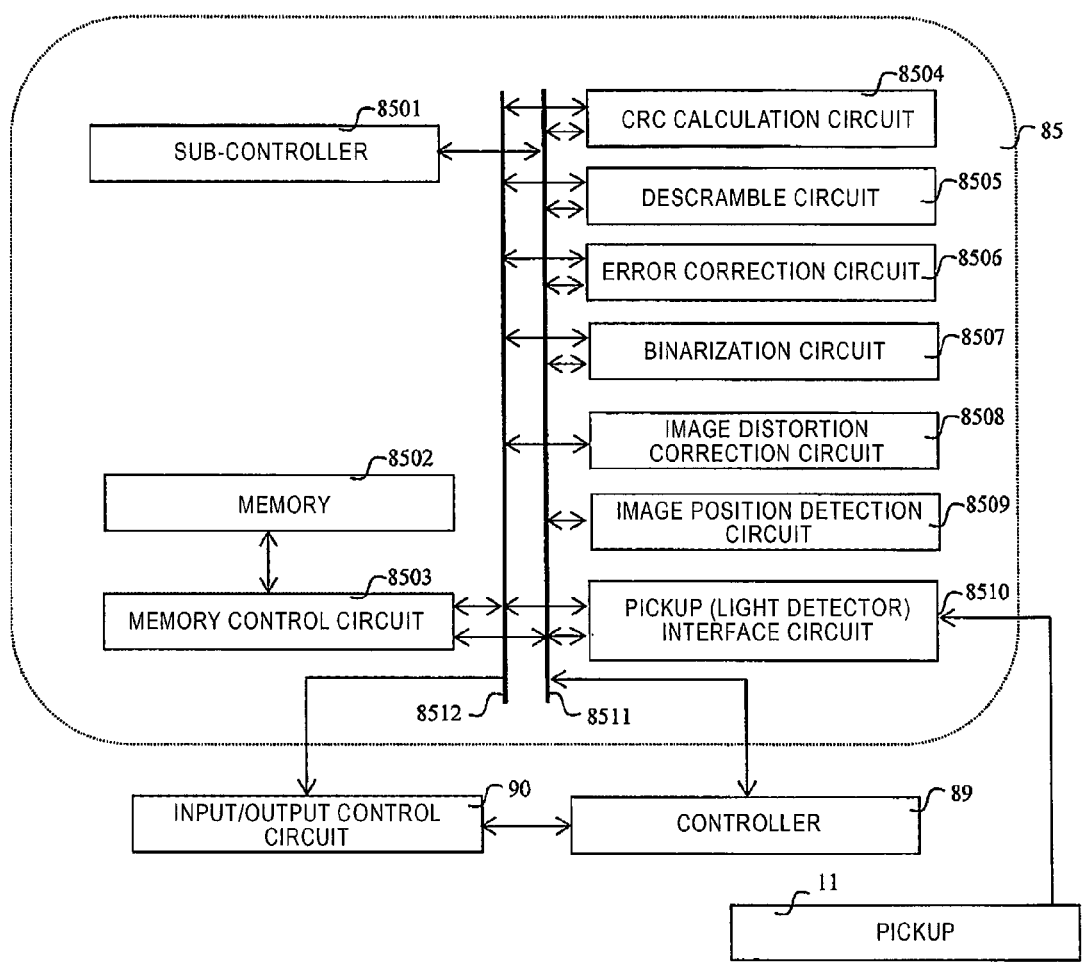
FIG. 14 is a block diagram illustrating a signal processing circuit in a hologram recording/reproducing device.

FIG. 14 is a block diagram of the signal processing circuit 85 of the hologram recording/reproducing device 10.

If the light detector 225 in the pickup 11 detects image data, the controller 89 instructs the signal processing circuit 85 to perform reproducing process of data corresponding to one page input from the pickup 11. The processing instruction from the controller 89 is notified to a sub-controller 8501 in the signal processing circuit 85 through a control line 8511. After receiving the notification, the sub-controller 8501 controls respective signal processing circuits through the control line 8511 to operate the respective signal processing circuits in parallel. First, the sub-controller 8501 controls a memory control circuit 8503 to store the image data input from the pickup 11 through a pickup interface circuit 8510 in a memory 8502. If the image data stored in the memory 8502 reaches a predetermined amount, an image position detecting circuit 8509 performs control for detecting a marker from the image data stored in the memory 8502 to extract a valid data range. Then, the sub-controller 8501 performs control for correcting inclination, magnification and distortion of the image to convert the image data into an expected size of two-dimensional data, by an image distortion correction circuit 8508 using the detected marker. Then, the sub-controller 8501 performs control for determining respective pieces of bit data of plural bits that form the size-converted two-dimensional data as "0" and "1" for binarization in a binarization circuit 8507, and storing the data with arrangement of outputs of reproduction data on the memory 8502. Then, the sub-controller 8501 corrects an error included in each data string by an error correction circuit 8506, and releases the scrambling of adding the pseudo random number data string by a scramble release circuit 8505, and then, confirms that the error is not included in the reproduction data on the memory 8502 by a CRC operation circuit 8504. Then, the sub-controller 8501 transmits the reproduction data from the memory 8502 to the input/output control circuit 90.

Here, a processing flow of the data recording process S415 according to this example will be described with reference to FIG. 5.

If the data recording process starts (step S501), first, a variable k for counting is reset to zero, that is, k=0 (step S502).

After step S502, the hologram recording/reproducing device 10 pre-cures a predetermined region using a light beam emitted from the cure optical system 13 (step S503). The pre-cured region in step S503 is hereinafter referred to as a pre-cure region.

After step S503, the hologram recording/reproducing device 10 performs hologram recording using signal light and reference light. Here, the hologram recording/reproducing device 10 further performs angle multiplexing by changing the angle of the reference light to perform multiple recording with respect to the same volume. In this specification, a region where the multiple recording is performed with respect to the same volume of the hologram recording medium 1 by changing only the angle of the reference light is referred to as a unit of a book. That is, after step S503, the multiple recording with respect to one book is performed (step S504).

In this example, it is assumed that the pre-cure region pre-cured in step S503 is larger than the size of one book.

By covering the book on the hologram recording medium 1, information recording is performed. A covering unit of the book is referred to as a bookcase in this specification. Further, in this example, it is assumed that the pre-cure region and the bookcase are the same. That is, the pre-cure region pre-cured in step S503 is divided into regions of a predetermined size called the book, and the recording is performed with respect to each book.

Subsequently, it is determined whether the recording of all the books is completed with respect to a bookcase that is currently recorded (which is, in this example, the same as the pre-cure region where the pre-curing is performed in step S503) (step S505).

When the recording of all the books is not completed with respect to the bookcase that is currently recorded (No in step S505), book movement is performed (step S506). This process is performed by moving the hologram recording medium 1 by the medium transport unit 50, so that the hologram recording medium 1 is positioned at a position in a non-recorded state in the bookcase that is currently recorded. After step S506, the procedure returns to step S504, and the book recording is performed with respect to the position positioned in step S506.

When the reading of all the books is completed with respect to the bookcase that is currently recorded (Yes in step S505), the pre-cure region pre-cured in step S503 is in a state of being covered by the books where the recording is completed. That is, according to the above-described operation, the recording process is performed so that holograms are recorded at a predetermined interval in the predetermined region (bookcase) on the hologram recording medium.

In order to distinguish the above recording from a recording of a single book, in this specification, an expression of bookcase recording is used. The bookcase recording refers to a series of recording of performing hologram recording while changing a recording position so that the inside of the predetermined region called the bookcase is in a state where holograms on which information is recorded are disposed at a predetermined interval. The bookcase recording may also be referred to as an operation of covering and recording the books with respect to the predetermined region called the bookcase.

In this example, the bookcase recording is performed by an instruction from the controller 89. The bookcase recording is performed by driving the medium transport unit 50 to change the recording position through the medium transport control circuit 81, and by controlling the irradiation time of the reference light and the signal light through the shutter control circuit 87 according to the instruction from the controller 89. That is, in this example, the controller 89 functions as means for performing the bookcase recording.

When the determination result in step S505 is Yes, the variable k is counted up (step S507), and it is determined whether the variable k is equal to or greater than a predetermined numerical value N (step S508). Here, it is assumed that the predetermined numerical value N is an integer of 2 or greater.

When the variable k is smaller than the predetermined numerical value N (No in step S508), the next bookcase movement is performed (step S509). This process is realized by controlling the medium transport control circuit 81 to change the position of the hologram recording medium 1 so that the positions of the pickup 11 and the cure optical system 13 are relatively changed. After step S509, the procedure returns to step S503. Though the above operation, the bookcase recording is similarly performed with respect to the next bookcase.

When the variable k is equal to or greater than the predetermined numerical value N (Yes in step S508), the post-curing is performed using a light beam emitted from the cure optical system 13 with respect to a region where the recording is completed and the post-curing is not performed (step S510). After the counter resetting of step S502, when N bookcases are all covered by the recorded books, this condition is satisfied, and the post-curing is performed with respect to the N bookcases in step S510. The region post-cured in step S510 is hereinafter referred to as a post-cure region. A post-curing order of the N bookcases will be described later.

After step S510, it is determined whether the recording is completed with respect to the entire surface of the hologram recording medium 1 (step S511). When the recording is not completed with respect to the entire surface of the hologram recording medium 1 (No in step S511), the medium transport unit 50 is driven to change the position of the hologram recording medium 1, thereby moving to the next bookcase (step S512). After step S512, the procedure returns to step S502.

If the procedure returns to step S502 after step S512, the variable k is reset. Through the above operation, the variable k becomes a variable for counting the number of the bookcases covered by the books where the post-curing is not performed and the recording is completed.

When the recording is completed with respect to the entire surface of the hologram recording medium 1 (Yes in step S511), the data recording process is terminated (step S513).

As described above, in this example, the post-curing is performed immediately after the bookcase recording with respect to the bookcases is completed. A series of operations of performing the pre-curing for each bookcase and performing the bookcase recording with respect to the bookcase (in other words, covering and recording the books with respect to the bookcase) is performed plural times (N), and the post-curing is collectively performed with respect to the N bookcases. This operation is repeated until the recording with respect to the entire surface of the hologram recording medium 1 is completed.

FIG. 6 is a diagram illustrating a relationship between a pre-cure region, a bookcase, a book, and a post-cure region in this example.

Figure 6A:
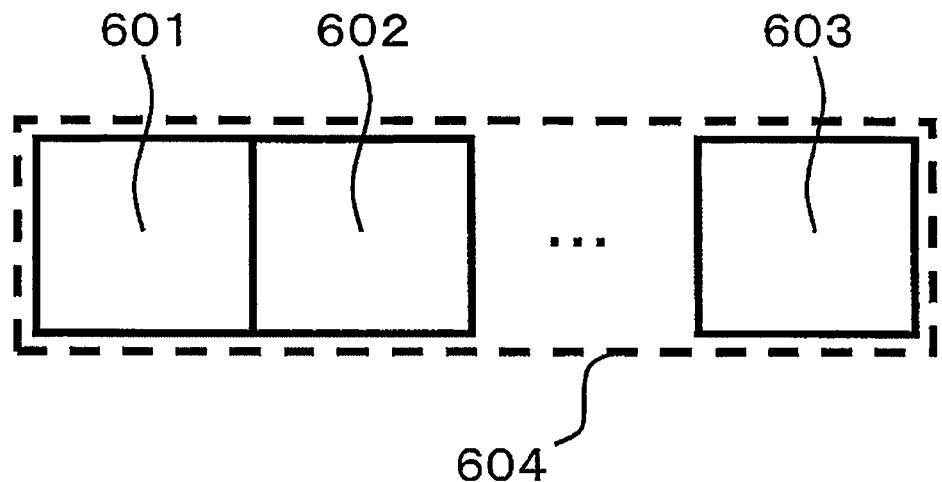
FIG. 6(a) is a diagram illustrating a relationship between a pre-cure region, a bookcase, and a post-cure region in Example 1.

Reference numerals 601, 602, and 603 in FIG. 6(a) represent bookcases, which are the same as the pre-cure regions in this example. In this example, it is assumed that the bookcase has a rectangular shape. Further, it is assumed that bookcase recording is performed with respect to total N bookcases in the order of reference numeral 601, reference numeral 602, . . . , and reference numeral 603. Reference numeral 604 represents a post-cure region, which is a set of the above-described N bookcase.

Figure 6B:
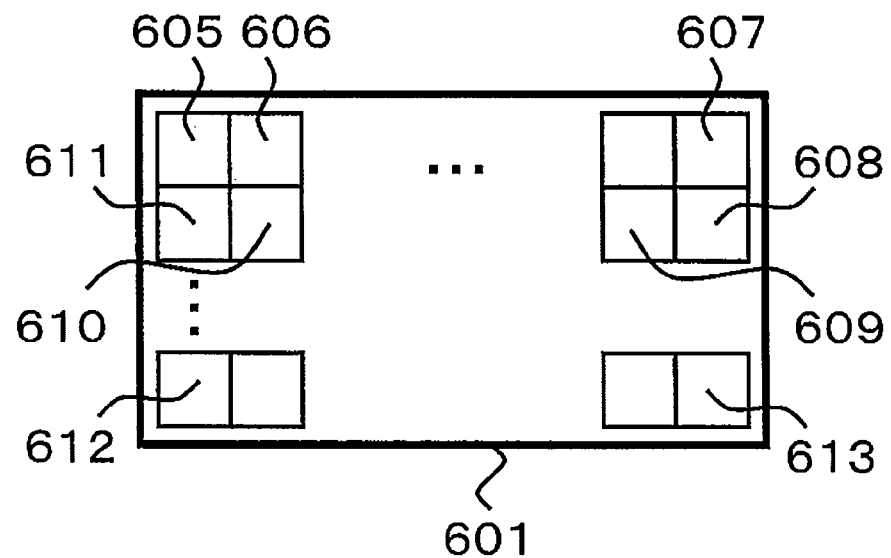
FIG. 6(b) is a diagram illustrating a relationship between the bookcase and a book in Example 1.

FIG. 6(b) shows a single bookcase, which shows a first bookcase 601 as an example. Reference numerals 605 to 613 represent books. Here, the books are arranged at a predetermined interval inside the first bookcase 601. In the following description, similar to the definition of a matrix in mathematics, a set of books arranged in a transverse direction in FIG. 6(b) is referred to as a row, and a set of books arranged in a longitudinal direction is referred to as a column.

The size of numerical values of reference numerals attached to the respective books corresponds to a recording order of books during recording. That is, the recording order of the books in the first bookcase 601 is set so that a book 605 is first recorded, and then, a book 606 is recorded. Similarly, the order moves right in the figure to record a book 607. After the book 607 is recorded, the order moves down to record a book 608. Then, a book 609 to a book 611 are recorded while moving the order left. By repeating such an operation, a book 612 and a book 613 provided in a lower end part are recorded while moving the order right. In this way, the recording order in this example is set so that the recording is performed while alternately reversing the recording direction right and left for each row.

Here, the recording order of the books in the first bookcase 601 is described, but it is assumed that the same recording is performed with respect to the other bookcases.

In this way, the books are recorded at a predetermined interval inside the bookcase, and consequently, a series of book recording is performed in the unit of the rectangular bookcase. Further, the book recording order is discontinuous between the bookcase 601 and the bookcase 602. In this way, the bookcases may be units having a discontinuous book recording order.

Next, in the post-curing process of step S510, a post-curing order of the N bookcases will be described. Since the cure optical system 13 in this example is common between pre-curing and post-curing, an area capable of being cured once is common. This common configuration has an advantage of reducing the number of components and achieving miniaturization.

When the cure optical system 13 is common in this way, it is necessary to perform the irradiation of the light beam N times in the post-curing process S510. In this example, total N regions are post-cured in the order of reference numeral 601, reference numeral 602, . . . , and reference numeral 603.

That is, when collectively performing the post-curing with respect to the N bookcases, the post-curing is performed by applying the light beam emitted from the cure optical system 13 in the order of the regions where the bookcase recording is performed.

Figure 6C:
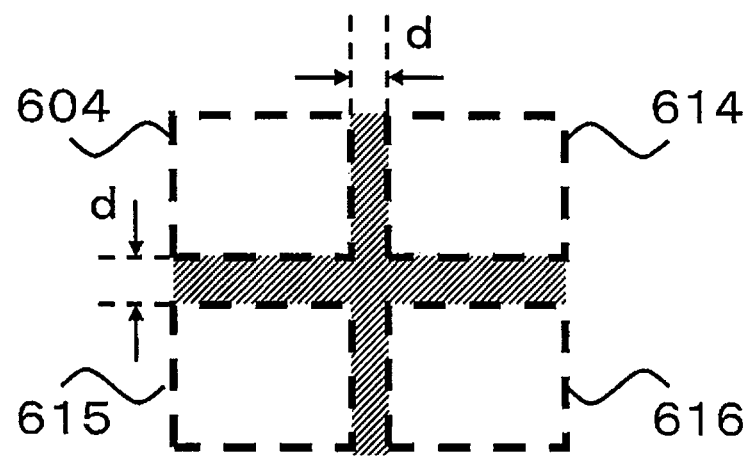
FIG. 6(c) is a diagram illustrating arrangement of the post-cure region in Example 1.

Further, FIG. 6(c) is a diagram illustrating arrangement of the post-cure region. In FIG. 6(c), reference numeral 604 is the same as the post-cure region 604 in FIG. 6(a), and reference numerals 614 to 616 represent post-cure regions, respectively.

When the determination result in step S511 is No and the procedure proceeds to step S512, the recording order moves to a region to be post-cured next. Here, between the post-cure regions, a predetermined width d is provided as shown in FIG. 6(c). Further, in a region of the width d indicated by hatching, a book where dummy information is recorded is covered. A process of recording the dummy book is not shown in the processing flow in FIG. 5.

Next, effects of this example will be described.

In the hologram recording, the pre-curing is first performed, the hologram recording such as angle multiplexing is performed, and then, the post-curing is performed.

With respect to the post-curing, it is necessary to sufficiently consider the following three problems. The first problem is that it is necessary to perform the post-curing when a predetermined amount of time elapses after the hologram recording. In the hologram recording, first, an interference fringe may occur due to interference of the signal light and the reference light, and a monomer may move to follow the fringe due to diffusion, which may cause a refractive index variation in the medium. Further, the refractive index variation may be fixed by the post-curing. The first problem occurs since time is necessary for the diffusion of the monomer in the recording process. In this specification, the time is referred to as a dark reaction time. That is, the first problem may be expressed as the occurrence of a waiting time of the dark reaction time. The dark reaction time depends on a medium characteristic, which is about several minutes, for example. If the post-curing is performed without waiting for a sufficient time after the hologram recording, a sufficient refractive index cannot be obtained during reproduction, which may result in reproduction failure.

The second problem is that there is a time restriction until the post-curing is performed after the hologram reading. The time restriction may be also referred to as a post-curing time-out. For example, when the hologram recording medium has the same area as that of an optical disc such as a DVD, the inventors found that the post-curing time-out was shorter than a time necessary for the whole surface recording.

That is, when the post-curing is first performed after the whole surface recording is finished, the post-curing time-out already expires with respect to a book initially recorded with respect to the hologram recording medium. If the post-curing is performed after the post-curing time-out expires, a sufficient refractive index cannot be obtained during reproduction, which may result in reproduction failure.

The problem relating to the post-curing time-out may be solved as the whole surface recording time becomes fast. However, the inventors found that the second problem could not be neglected when considering an actual transmission speed and a value of a post-curing time-out on an actual medium.

The post-curing time-out depends on a medium characteristic, which is about 30 minutes, for example. For example, when a medium of which the post-curing time-out is 30 minutes is used, if a time necessary for the whole surface recording (including a time necessary for the pre-curing)

exceeds 30 minutes, the post-curing cannot be initially performed after the whole surface recording is finished.

The third problem is that the books cannot be continuously arranged around a range where the post-curing is performed. This is because the books cannot be continuously arranged since the medium is contracted due to the post-curing and is locally distorted around the post-cured region. Thus, normally, around the range where the post-curing is performed, the book where the dummy information is recorded is covered, and the books where data is recorded are arranged at a predetermined interval. A region where the book where the dummy information is recorded is covered is referred to as a dummy region. Since the dummy region becomes a region where information is not recorded, if the dummy region is large, the recording capacity is reduced. Accordingly, it is preferable that the dummy region be small.

When consideration of the first problem and the second problem is insufficient, insufficient recording is caused. Thus, it is necessary to perform the recording process in consideration of the two problems. Further, the third problem is a problem to be considered in a state where the width of a region to be post-cured is determined.

Further, in the case of the pre-curing, when the pre-curing is performed immediately before the hologram recording such as angle multiplexing is performed, it is possible to obtain a sufficient refractive index. That is, when the pre-cure region is excessively broad, a problem may also occur.

In order to solve the first problem and the second problem, a configuration is used in which after book recording with respect to a predetermined region is performed and before a dark reaction time of the predetermined region elapses, book recording with respect to the next region is performed, and after the dark reaction time of the predetermined region elapses, post-curing with respect to the predetermined region is performed. Further, in order to solve the third problem, a configuration is used in which a region where post-curing is performed once can be enlarged.

The problems when the invention is not applied will be described in detail using the first bookcase 601 shown in FIG. 6(b). The final recorded book in the first bookcase 601 is the book 613. When the book 613 is recorded and thus the recording of all the books inside the bookcase 601 is completed, the post-curing cannot be immediately performed. Thus, it is necessary to perform the post-curing after waiting for the above-described dark reaction time. That is, by the series of operations of performing the pre-curing, performing the bookcase recording, and performing the post-curing after waiting for the dark reaction time, the information recording with respect to the bookcase 601 is completed.

However, in this case, the process of waiting for the dark reaction time occurs. Since the waiting time occurs for each bookcase, when the whole surface of the hologram recording medium is recorded, dead time becomes long. Further, as described above, the post-curing cannot be initially performed after the whole surface recording is finished. As described above, when solving the first problem and the second problem without using the invention, the process of waiting for the dark reaction time occurs. Since the configuration disclosed in the above-mentioned PTL 1 is made in consideration of the dark reaction time, appropriate recording with respect to the hologram recording medium can be realized, but there is a problem in view of the recording time with respect to the hologram recording medium. Thus, if the waiting time of the dark reaction time can be reduced, the recording time can be reduced.

On the other hand, according to this example, instead of waiting for the time until the dark reaction time of the book 613 finally recorded in the first bookcase 601 elapses after the recording of the first bookcase 601 is completed, the bookcase recording is performed with respect to the bookcase 603 that is an N-th bookcase from the second bookcase 602. Here, when the book recording of the bookcase 603 is completed, it is assumed that the dark reaction time of the book 613 elapses. In other words, N is determined to satisfy this condition.

After the bookcase recording with respect to the N-th bookcase 603 is completed, the first bookcase 601 is post-cured, and then, the second bookcase 602 to the N-th bookcase 603 are sequentially post-cured. By performing the bookcase recording with respect to the next bookcase until the dark reaction time of the book 613 elapses using such an operation, the book recording can be continuously performed without generating the waiting time of the dark reaction time. Thus, the first problem can be solved.

Further, since the dark reaction time is about several minutes, the post-curing can be performed before the post-curing time-out elapses, and thus, the second problem can be also solved.

Further, according to this example, the post-cure region (604 in FIG. 6) can be enlarged N times compared with the pre-cure region (for example, 601 in FIG. 6(a)). When the invention is not applied, the pre-cure region and the post-cure region have the same area, and it is necessary to provide the dummy region between the first pre-cure region 601 and the second pre-cure region 602 in FIG. 6(a). On the other hand, according to this example, it is not necessary to leave a non-recorded portion of a predetermined amount between the first pre-cure region 601 and the second pre-cure region 602 in FIG. 6(a), and it is possible to continuously arrange books over a whole range of the post-cure region 604. Since the size of the pre-cure region can be made the same as an existing size, a problem does not occur in the pre-curing.

The recording order of the books in the bookcase according to this example is set so that the recording is performed while alternately reversing the recording direction right and left for each row as shown in FIG. 6(b), but the order is not limited thereto. For example, the recording may be performed in the same direction for each row, or may be performed in the longitudinal direction for each column.

Using the above-described operation, it is possible to perform the recording process in consideration of the dark reaction time and the post-curing time-out, and simultaneously realize appropriate recording with respect to the hologram recording medium and reduction of the recording time. Further, it is possible to enlarge the post-cure region, and to reduce the dummy region to increase the recording capacity.

As described above, according to this example, it is possible to realize appropriate recording with respect to the hologram recording medium.

Example 2

In Example 1, the bookcase is formed in a rectangular shape. The rectangular shape of the bookcase is an optimal configuration when the hologram recording medium is rectangular. In this example, an embodiment in which the hologram recording medium is circular is considered.

Figure 7:
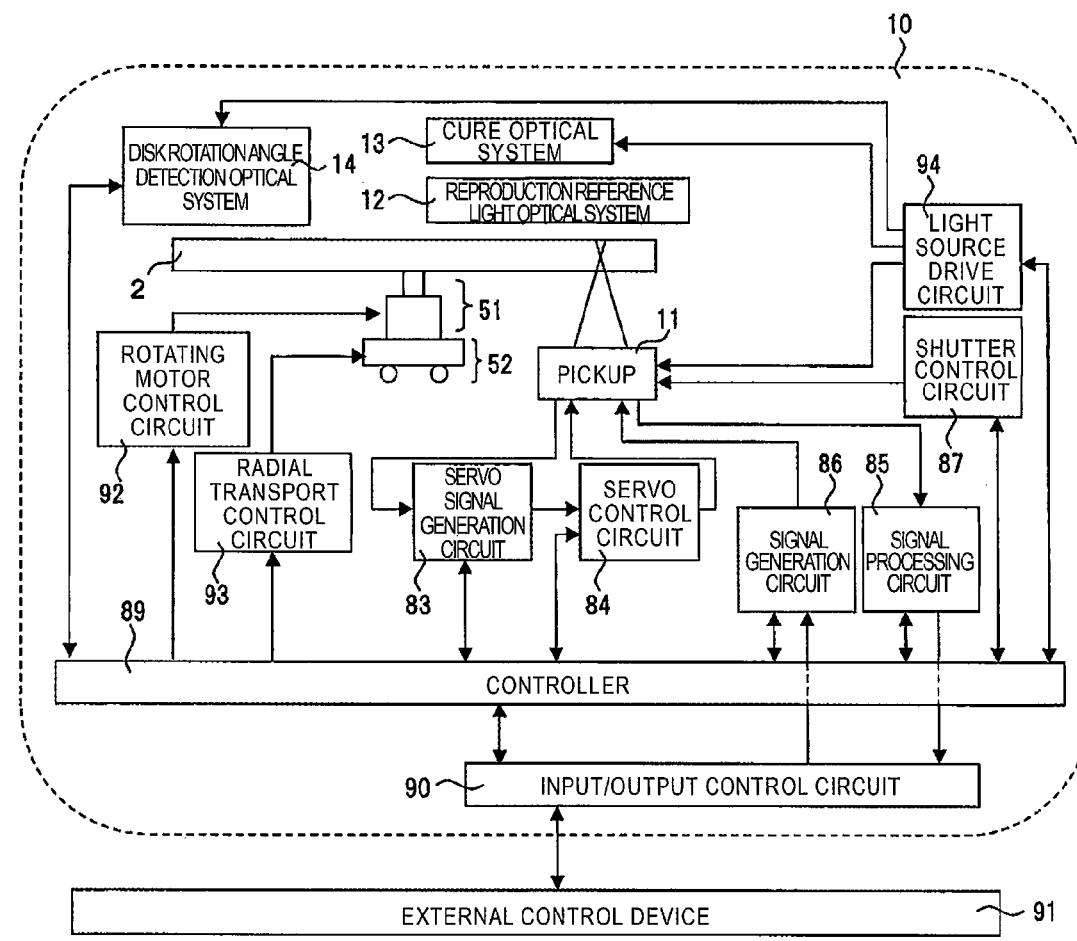
FIG. 7 is a block diagram illustrating a hologram recording/reproducing device in Example 2.

The embodiment of the invention will be described with reference to the accompanying drawings. FIG. 7 is a block diagram illustrating a recording/reproducing device of a hologram recording medium that records and/or reproduces digital information using holography. The same reference numerals are given to the same component as those shown in FIG. 1 that is the block diagram illustrating Example 1, and description thereof will not be repeated.

The hologram recording/reproducing device 10 includes the pickup 11, the reproduction reference light optical system 12, the cure optical system 13, a disc rotation angle detection optical system 14, a rotating motor 51, and a radial transport unit 52, in which a hologram recording medium 2 is movable by the rotating motor 51. At the same time, the hologram recording medium 2 is movable in the radial direction by the radial transport unit 52.

A component that performs a control so that a predetermined position of the hologram recording medium 2 is irradiated with a light beam emitted from the pickup 11 and the reproduction reference light optical system 12 is a component capable of controlling two axes of the X axis and the Y axis by one medium transport unit 50 in Example 1, but in this example, is realized by two components of the rotating motor 51 and the radial transport unit 52.

The disk rotation angle detection optical system 14 is used for detecting the rotation angle of the hologram recording medium 2. The hologram recording medium 2 of this example has a pattern for detecting the rotation angle. When the hologram recording medium 2 is adjusted at a predetermined rotation angle, a signal based on the rotation angle may be detected by the disk rotation angle detection optical system 14, the rotating motor 51 may be driven through a rotating motor control circuit 92 by the controller 89 using the detected signal, and the rotation angle of the hologram recording medium 2 may be controlled.

When the radial position of the hologram recording medium 2 is adjusted, the radial transport unit 52 may be driven through a radial transport control circuit 93 by the controller 89, and the radius position of the hologram recording medium 2 may be controlled.

In this example, the rotating motor control circuit 92, the rotating motor 51, the radial transport control circuit 93, and the radial transport unit 52 function as means for changing the recording position on the hologram recording medium 1.

A predetermined light source driving current is supplied to light sources in the pickup 11, the cure optical system 13, and the disk rotation angle detection optical system 14 from a light source drive circuit 94 in this example, so that each light source may emit a light beam with a predetermined light intensity.

Further, the pickup 11, the cure optical system 13, and the disk rotation angle detection optical system 14 may be simplified by integrating some or all of optical system configurations thereof.

An operation flow from the time when the hologram recording medium 2 is inserted to the hologram recording/reproducing device 10 to the time when preparation of recording or reproduction is completed, an operation flow from the time when the preparation is completed to the time when information is recorded on the hologram recording medium 2, and an operation flow from the time when the preparation is completed to the time when information recorded on the hologram recording medium 2 is reproduced are the same as in FIG. 4 that are the operation flows in Example 1, but the operation flow of only the data recording process S415 is different therefrom. When positioning of the hologram recording medium, the medium transport unit 50 is controlled in Example 1, but in this example, the rotating motor 51 and the radial transport unit 52 may be controlled by appropriate combination thereof.

Hereinafter, the processing flow of the data recording process S415 according to this example will be described with reference to FIG. 9.

If the data recording process starts (step S901), first, a variable k, a variable i, and a variable j for counting are reset to zero, that is, k=i=j=0 (step S902).

After step S902, the hologram recording/reproducing device 10 pre-cures a predetermined region using a light beam emitted from the cure optical system 13 (step S903). The pre-cured region in step S903 is hereinafter referred to as a pre-cure region.

After step S903, the hologram recording/reproducing device 10 performs hologram recording using signal light and reference light. Here, the hologram recording/reproducing device 10 further performs angle multiplexing by changing the angle of the reference light to perform multiple recording with respect to the same volume. That is, after step S903, the multiple recording with respect to one book is performed (step S904).

In this example, it is assumed that the pre-cure region pre-cured in step S903 is larger than the size of one book.

In this example, it is assumed that the pre-cure region and the bookcase are the same. That is, the pre-cure region pre-cured in step S903 is divided into regions of a predetermined size called the book, and the recording is performed with respect to each book.

After step S904, the variable i is counted up (step S905). Then, it is determined whether the variable i is equal to or greater than a j-th element of a predetermined arrangement T, that is, T [j] (step S906).

When the variable i is smaller than T [j] (No in step S906), the hologram recording/reproducing device 10 drives the rotating motor 51 through the rotating motor control circuit 92 to move the book in a circumferential direction (step S907). This process is realized by driving the rotating motor 51 to rotate the hologram recording medium 2 so that the positions of the pickup 11 and the cure optical system 13 are relatively changed.

After step S907, the variable i is reset (step S908), and the procedure returns to step S904. After returning to step S904, book recording is performed with respect to the position positioned in step S907.

Through the above-described operation, the variable i becomes a variable for counting the number of recorded books that are covered in the circumferential direction.

When the variable i is equal or greater than T [j] (Yes in step S906), the variable j is counted up (step S909), and then, it is determined whether the recording of all books is completed with respect to a bookcase that is currently recorded (step S910).

When the recording of all books is not completed with respect to the bookcase that is currently recorded (No in step S910), the hologram recording/reproducing device 10 drives the radial transport unit 52 through the radial transport control circuit 93 to move the book in the radial direction (step S911). This process is realized by driving the radial transport unit 52 to transport the hologram recording medium 2 in the radial direction so that the positions of the pickup 11 and the cure optical system 13 are relatively changed.

After step S911, the variable j is reset, and the procedure returns to step S904. After returning to step S904, the book recording is performed with respect to the position positioned in step S911. Through the above-described operation, the variable j becomes a variable for counting the number of rows where recorded books are covered in the circumferential direction. This may be considered as a variable for counting the number of recorded books that are covered in the radial direction.

When the recording of all books is completed with respect to the bookcase that is currently recorded (Yes in step S910), the pre-cure region where the pre-curing is performed in step S903 is in a state where the recorded books covered therein. That is, according to the above-described operation, the bookcase recording is performed so that the holograms are recorded at a predetermined interval inside the predetermined region (bookcase) on the hologram recording medium.

In this example, the bookcase recording is performed by an instruction from the controller 89. The bookcase recording is performed by driving the rotating motor 51 and the radial transport unit 52 through the rotating motor control circuit 92 and the radial transport control circuit 93 to change the recording position, and by controlling the irradiation time of the reference light and the signal light through the shutter control circuit 87 according to the instruction from the controller 89. That is, in this example, the controller 89 functions as means for performing the bookcase recording.

When the determination result in step S910 is Yes, the variable k is counted up (step S913), and it is determined whether the variable k is equal to or greater than a predetermined numerical value N (step S914). Here, it is assumed that the predetermined numerical value N is an integer of 2 or greater.

When the variable k is smaller than the predetermined numerical value N (No in step S914), the hologram recording/reproducing device 10 drives the rotating motor 51 through the rotating motor control circuit 92 to move to the next bookcase (step S915). After step S915, the procedure returns to step S903. Though the above-described operation, the bookcase recording is similarly performed with respect to the next bookcase.

When the variable k is equal to or greater than the predetermined numerical value N (Yes in step S914), the post-curing is performed using a light beam emitted from the cure optical system 13 with respect to a region where the recording is completed and the post-curing is not performed (step S916). After the counter resetting of step S902, when N bookcases are all covered by the recorded books, this condition is satisfied, and the post-curing is performed with respect to the N bookcases in step S916. The region post-cured in step S916 is hereinafter referred to as a post-cure region. A post-curing order of the N bookcases will be described later.

After step S916, it is determined whether the recording is completed with respect to the entire surface of the hologram recording medium 2 (step S917). When the recording is not completed with respect to the entire surface of the hologram recording medium 2 (No in step S917), the rotating motor 51 or the radial transport unit 52 is driven to change the position of the hologram recording medium 2, thereby moving to the next bookcase (step S918). After step S918, the procedure returns to step S902.

If the procedure returns to step S902 after step S912, the variable k is reset. Through the above operation, the variable k becomes a variable for counting the number of the bookcases covered by the books where the post-curing is not performed and the recording is completed.

When the recording is completed with respect to the entire surface of the hologram recording medium 2 (Yes in step S917), the data recording process is terminated (step S919).

As described above, in this example, the post-curing is not performed immediately after the bookcase recording with respect to the bookcases is completed. A series of operations of performing the pre-curing for each bookcase and performing the bookcase recording with respect to the bookcase (in other words, covering and recording the books with respect to the bookcase) is performed plural times (N), and the post-curing is collectively performed with respect to the N bookcases. This operation is repeated until the recording with respect to the entire surface of the hologram recording medium 2 is completed.

FIG. 8 is a diagram illustrating a relationship between a pre-cure region, a bookcase, a book, and a post-cure region in this example.

Figure 8A:
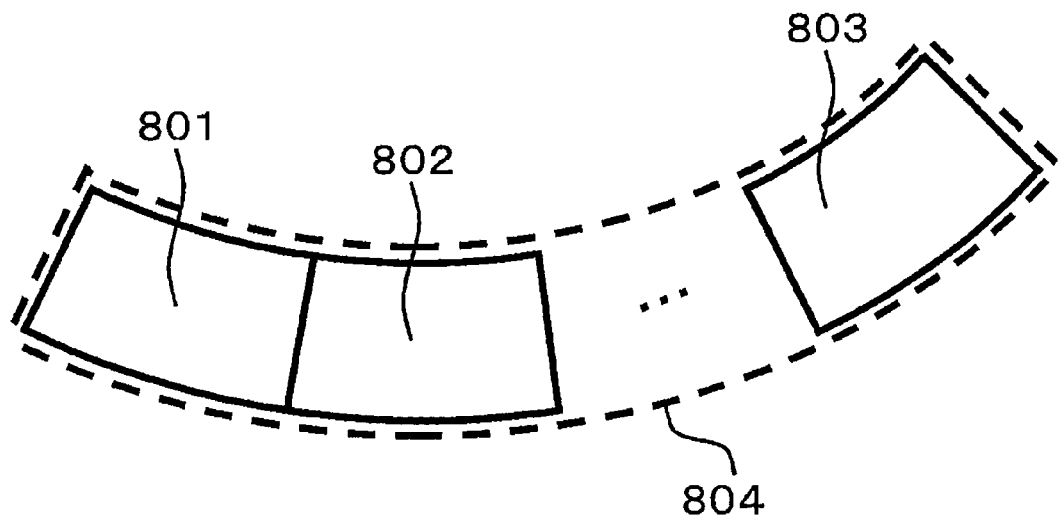
FIG. 8(a) is a diagram illustrating a relationship between a pre-cure region, a bookcase, and a post-cure region in Example 2.

Reference numerals 801, 802, and 803 in FIG. 8(a) represent bookcases, which are the same as the pre-cure regions in this example. In this example, it is assumed that the bookcase has a trapezoidal shape. Further, it is assumed that bookcase recording is performed with respect to total N bookcases in the order of reference numeral 801, reference numeral 802, ..., and reference numeral 803. Reference numeral 804 represents a post-cure region, which is a set of the above-described N bookcases.

Figure 8B:
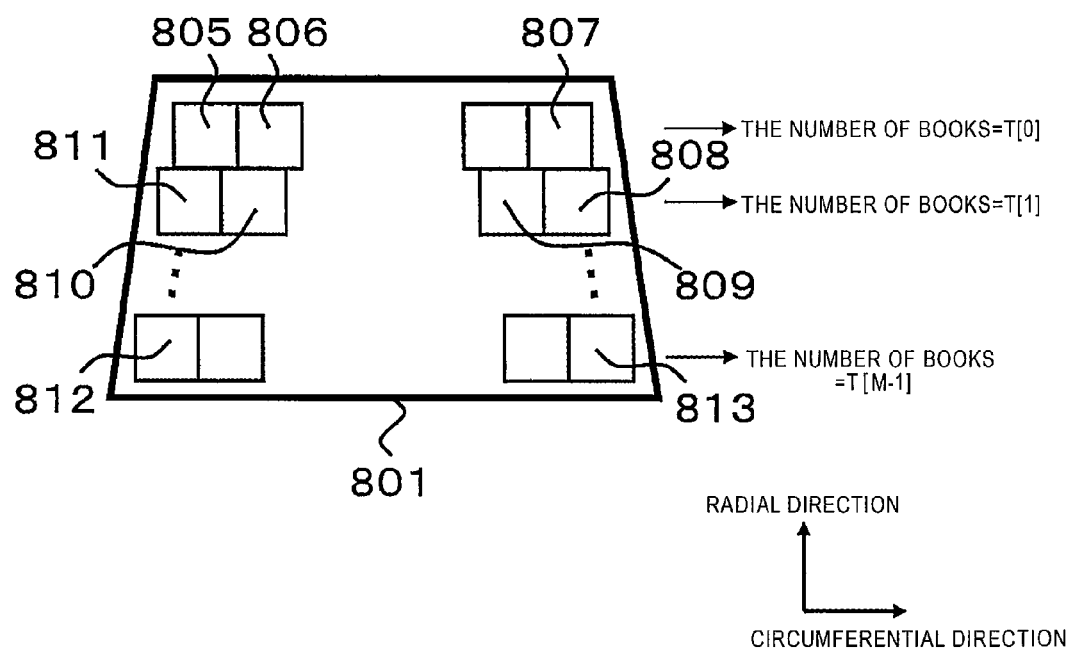
FIG. 8(b) is a diagram illustrating a relationship between the bookcase and a book in Example 2.

FIG. 8(b) shows a single bookcase, which shows a first bookcase 801 as an example. Reference numerals 805 to 813 represent books. Here, the books are arranged at a predetermined interval inside the first bookcase 801. In the following description, similar to definition of a matrix in mathematics, a set of books arranged in a transverse direction in FIG. 8(b) is referred to as a row, and a set of books arranged in a longitudinal direction is referred to as a column. Further, in FIG. 8(b), the transverse direction corresponds to a circumferential direction, and the longitudinal direction corresponds to a radial direction.

The size of numerical values of reference numerals attached to the respective books corresponds to a recording order of books during recording. That is, the recording order of the books in the first bookcase 801 is set so that a book 805 is first recorded, and then, a book 806 is recorded. Similarly, the order moves right in the figure to record a book 807. After the book 807 is recorded, the order moves down to record a book 808. Then, a book 809 to a book 811 are recorded while moving the order left. By repeating such an operation, a book 812 and a book 813 provided in a lower end part are recorded while moving the order right. In this way, the recording order in this example is set so that the recording is performed while alternately reversing the recording direction right and left for each row.

Further, since the bookcase has the trapezoidal shape, the number of books is different in each row in the bookcase. The number is managed by the arrangement T [j] using the column index j as a parameter. A variable M of FIG. 8(b) represents the number of rows of the bookcase covered by the books. That is, the height of the bookcase is M times the height of the book.

Here, the book recording order in the first bookcase 801 is described, but the same recording is performed with respect to the other bookcases.

In this way, the books are recorded at a predetermined interval inside the bookcase, and consequently, a series of book recording is performed in the unit of the trapezoidal bookcase. Further, the book recording order is discontinuous between the bookcase 601 and the bookcase 602. In this way, the bookcases may be units having a discontinuous book recording order.

In this way, since the single bookcase according to this example forms the trapezoidal shape as shown in FIG. 8(b), it is preferable to arrange the books along the circumferential direction of the circular hologram recording medium 2, as shown in FIG. 8(a).

Next, in the post-curing process of step S916, a post-curing order of the N bookcases will be described. Since the cure optical system 13 in this example is common between pre-curing and post-curing, an area capable of being cured once is common. This common configuration has an advantage of reducing the number of components and achieving miniaturization.

When the cure optical system 13 is common in this way, it is necessary to perform the irradiation of the light beam N times in the post-curing process S916. In this example, total N regions are post-cured in the order of reference numeral 801, reference numeral 802, . . . , and reference numeral 803.

That is, when collectively performing the post-curing with respect to the N bookcases, the post-curing is performed by applying the light beam emitted from the cure optical system 13 in the order of the regions where the bookcase recording is performed.

Next, effects of this example will be described.

Similar to the case of Example 1, it is possible to solve the first problem to the third problem described above. That is, it is possible to simultaneously realize appropriate recording with respect to the hologram recording medium and reduction of the recording time. Here, "the reduction of the recording time" represents reduction of the waiting time of the dark reaction time, so that the recording process can be performed without performing the process of waiting for the dark reaction time. Further, it is possible to enlarge the post-cure region, and to reduce the dummy region to increase the recording capacity.

Figure 9:
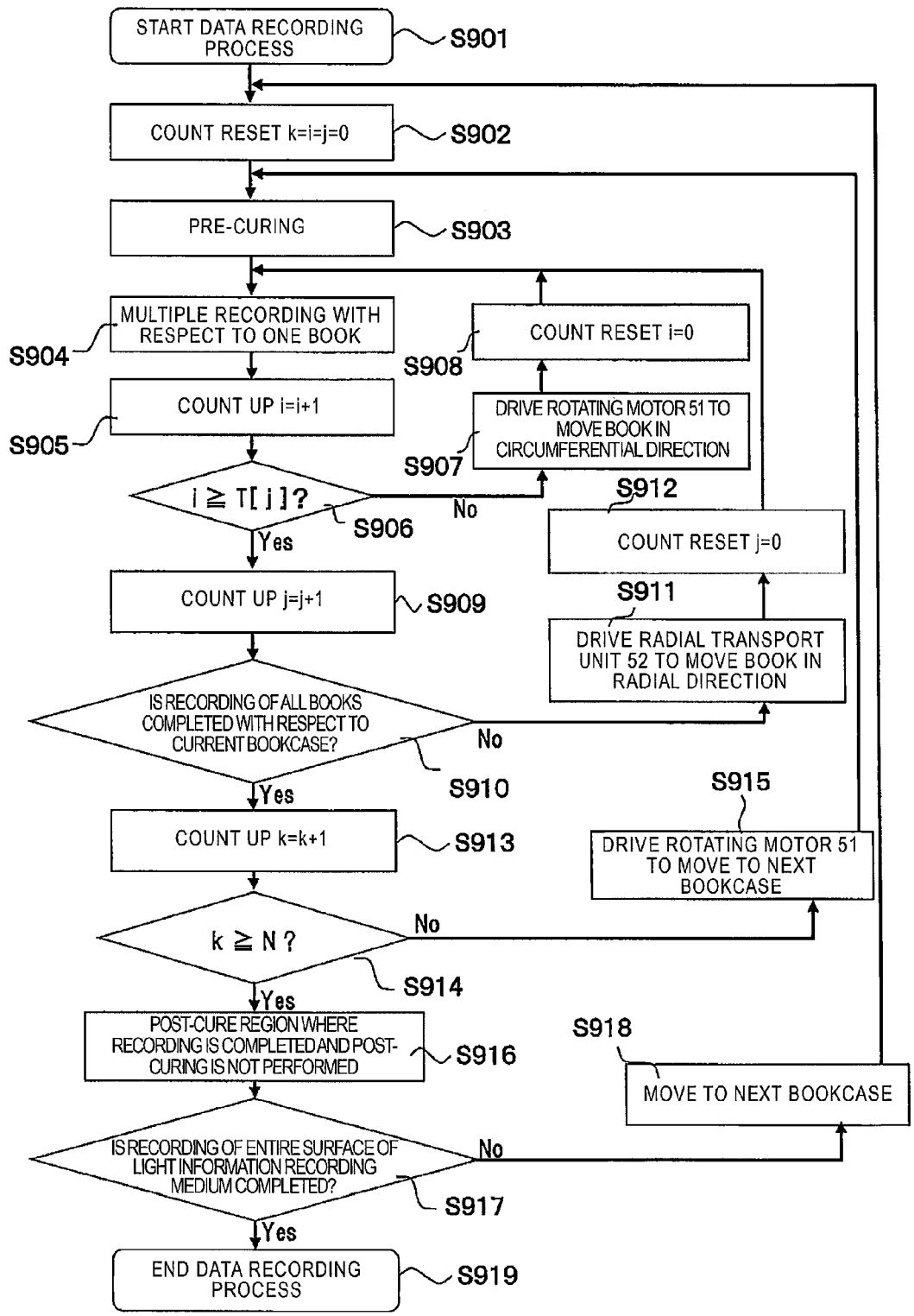
FIG. 9 is a processing flow of a data recording process in Example 2.

In addition, in this example, the recording time is further reduced using the processing flow in FIG. 9 considering that the hologram recording medium is circular. Hereinafter, this process will be described.

First, in the configuration of the example, with respect to movement between books, a speed when the rotating motor 51 is driven to move the hologram recording medium 2 moves by a distance between books is faster than a speed when the radial transport unit 52 is driven to move the hologram recording medium 2 moves by a distance between books. As is understood from FIG. 7, the hologram recording medium 2 is in contact with the rotating motor 51, and is integrally rotated with a rotating shaft. Thus, load applied to the rotating motor 51 corresponds to only the hologram recording medium 2. On the other hand, since the radial transport unit 52 is in contact with the rotating motor 51, load applied to the radial transport unit 52 corresponds to the rotating motor 51 and the hologram recording medium 2. That is, the radial transport unit 52 is driven in a state where the weight of the rotating motor 51 is applied thereto. As a result, the above-mentioned speed difference occurs.

Figure 10A:
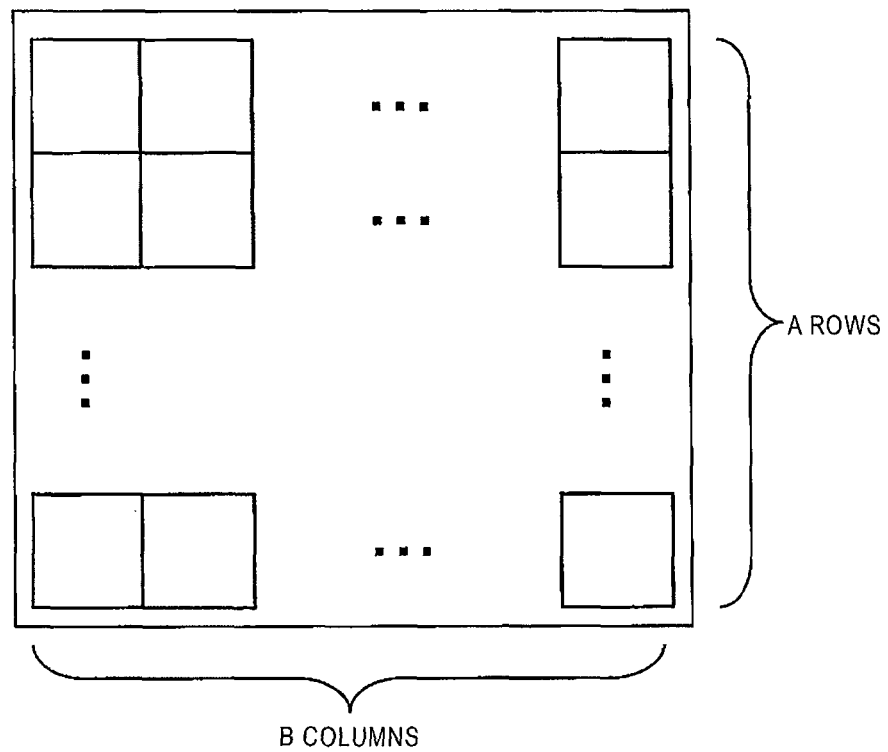
FIG. 10(a) is a diagram illustrating an effect of Example 2.
Figure 10B:
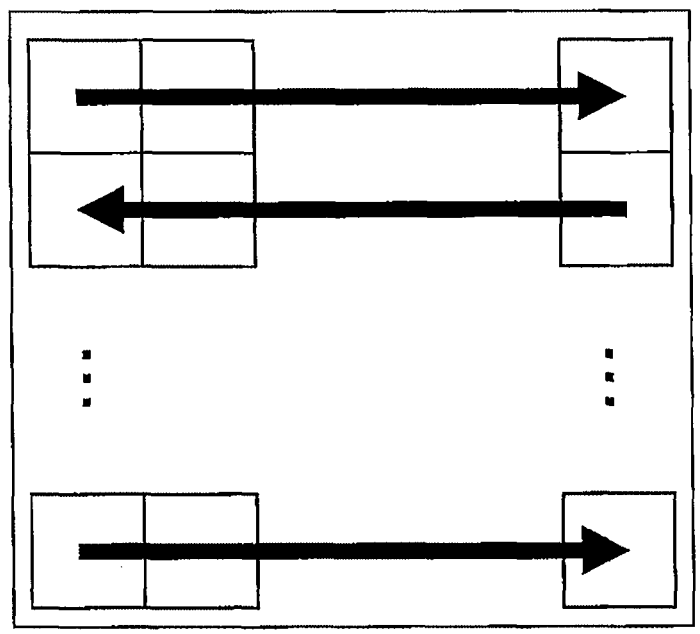
FIG. 10(b) is a diagram illustrating an effect of Example 2.

Next, an appropriate recording method in consideration of the speed difference will be described. Here, for ease of description, a case where the bookcase has a rectangular shape having A rows and B columns as shown in FIG. 10(*a*) and the book recording order is the same as that of the book movement method of Example 1 as shown in FIG. 10*b* will be described as an example. In this case, the number of movements N1 of the books in the transverse direction is as follows.

[Expression 1]

$$N1=(B-1)\times A \quad \text{(Expression 1)}$$

On the other hand, the number of movements N2 of the books in the longitudinal direction is as follows.

[Expression 2]

$$N2=A-1 \quad \text{(Expression 2)}$$

When B is 2 or greater, it is obvious that the following expression is obtained.

[Expression 3]

$$N1>N2 \quad \text{(Expression 3)}$$

Here, the assumption that B is 2 or greater is established in consideration of the size of the bookcase and the books.

It can be understood that as a direction where the rotating motor 51 is driven to move the book is set as the transverse direction and a direction where the radial transport unit 52 is driven to move the book is set as the longitudinal direction in consideration of the difference between the numbers of movements and the speed difference, the reduction of the recording time can be achieved.

Here, for ease of description of the reduction effect of the recording time, a case where the bookcase is rectangular is described as an example, but it is obvious that the same effect is similarly achieved in a case where the bookcase is the trapezoidal shape as in this example. That is, it can be understood that even when the bookcase is the trapezoidal shape as in this example, as the direction where the rotating motor 51 is driven to move the book is set as the transverse direction in FIG. 8 and the direction where the radial transport unit 52 is driven to move the book is set as the longitudinal direction in FIG. 8, the reduction of the recording time can be achieved.

In FIG. 9 that shows the processing flow of this example, when covering and recording the books with respect to the trapezoidal bookcase, there are two loops including a loop for returning to step S904 when the determination result in step S906 is No and a loop for returning to step S904 when the determination result in step S910 is No. Here, the inner loop, that is, the loop for returning to step S904 when the determination result in step S906 is No has a high occurrence frequency.

In this example, in the case of the inner loop, that is, the loop for returning to step S904 when the determination result in step S906 is No, the rotating motor 51 is driven to perform the book movement. Further, in the case of the outer loop, that is, the loop for returning to step S904 when the determination result in step S910 is No, the radial transport unit 52 is driven to perform the book movement. Thus, the reduction of the recording time can be achieved.

Further, for the same reason, in the movement process to the next bookcase in step S915, the rotating motor 51 is driven. As a result, as shown in FIG. 8(*a*), the N bookcases are arranged in the circumferential direction.

In addition, since the light beam emitted from the cure optical system 13 is irradiated N times in the order of the regions where the bookcase recording is performed by the same way as in Example 1 to perform the post-curing, consequently, the rotating motor 51 is driven in N irradiations during the post-curing. That is, referring to FIG. 8(*b*), the post-curing process S916 of this example repeats an operation of post-curing the first bookcase 801, driving the rotating motor 51 to post-cure the second bookcase 802, and driving the rotating motor 51 again.

With such a configuration, the rotating motor 51 is driven with respect to both of the movement of the bookcase when the bookcase recording is sequentially performed with respect to the respective bookcases shown in FIG. 8(*a*) and the book movement when the post-curing is sequentially performed with respect to the respective bookcases. Accordingly, the reduction of the recording time can be further achieved.

In this example, the bookcase is formed in the trapezoidal shape considering that the hologram recording medium 2 is circular. However, even when the bookcase is formed as a rectangular shape similar to the case of Example 1 and the processing flow in FIG. 9 is used, an effect is obtained. When the hologram recording medium 2 is formed in the rectangular shape, the hologram recording mediums 2 cannot be arranged without a gap, and thus, the recording capacity is reduced. However, the preferential driving of a drive unit with a fast operating speed can be similarly realized even when the hologram recording medium 2 is formed in the rectangular shape, and thus, the reduction effect of the recording time is achieved.

Further, in this example, a case where the component that performs a control so that a predetermined position of the hologram recording medium 2 is irradiated with the light beam emitted from the pickup 11 and the reproduction reference light optical system 12 is realized by two components of the rotating motor 51 and the radial transport unit 52 is described, but the component is not limited thereto.

The component is generalized as follows. When there are two or more drive units that perform a control so that a predetermined position of the hologram recording medium 2 is irradiated with the light beam emitted from the pickup 11 and the reproduction reference light optical system 12 (in this example, the rotating motor 51 and the radial transport unit 52) and a difference between the respective operating speeds is present, it is preferable to perform a device design according to the following guideline.

A book movement direction with a high frequency in the bookcase recording (transverse direction in the case of FIG. 10) and a direction where the book movement is possible by the drive unit with a fast operating speed (the rotating motor 51 in the case of this example) are made to coincide with each other, and a book movement direction with a low frequency in the bookcase recording (longitudinal direction in the case of FIG. 10) and a direction where the book movement is possible by the drive unit with a slow operating speed (the radial transport unit 52 in the case of this example) are made to coincide with each other. The direction where the book movement is possible by the drive unit with the fast operating speed refers to a clockwise direction along the circumference or a counterclockwise direction along the circumference in the case of the example 2.

Further, with respect to the movement direction of the bookcases when the bookcase recording is performed with respect to the N bookcases, similarly, the movement direction of the bookcase and the direction where the book movement is possible by the drive unit with the fast operating speed (the rotating motor 51 in the case of this example) are made to coincide to each other.

In addition, in the post-curing process according to this example performed with respect to the post-cure region that includes the N bookcases, similarly, the drive unit with the fast operating speed (the rotating motor 51 in the case of this example) is driven to move the position of the light beam emitted from the cure optical system.

The device based on the above-described device design has the following characteristics. With respect to the post-cure region that includes the N bookcases, a movement direction between adjacent bookcases coincides with a direction where the position on the hologram recording medium is movable by driving means with the highest driving frequency among driving means driven in the bookcase recording process.

In the case of this example, the movement direction between the adjacent bookcases is the circumferential direction. Further, the direction where the position on the hologram recording medium is movable by the rotating motor 51 that is the driving means with the highest driving frequency when the bookcase recording is performed is also the circumferential direction.

Through the above operation, it is possible to perform the recording process in consideration of the dark reaction time and the post-curing time-out, and to simultaneously realizing appropriate recording with respect to the hologram recording medium and reduction of the recording time. Further, it is possible to enlarge the post-cure region, and to reduce the dummy region to increase the recording capacity.

As described above, according to this example, it is possible to realize appropriate recording with respect to the hologram recording medium.

In the above-described example, as a mechanism that performs the control so that the predetermined position of the hologram recording medium is irradiated with the light beam emitted from the pickup 11 and the cure optical system 13, a configuration that transports the hologram recording medium, for example, the medium transport unit 50 in Example 1 is used. However, the mechanism is not limited thereto. For example, a configuration in which the hologram recording medium is fixed and the pickup 11 or the cure optical system 13 is transported may be used.

In the above-described example, a configuration in which the incident angle of the reference light is changed to perform the recording based on the angular multiplexing is used, but when a multiplexing method other than the angle multiplexing is used, the invention may also be applied. Further, even when the hologram recording is performed without performing the multiple recording, the invention may also be applied.

The bookcase according to the above-described examples is formed in the rectangular shape in the case of Example 1, and in the trapezoidal shape in the case of Example 2, but the shape of the bookcase is not limited thereto. However, as described with reference to FIG. 6(*b*) or FIG. 8(*b*), in order to easily perform the operation of covering and recording the books with respect to the bookcase, it is advantageous that the bookcase have the approximately rectangular shape in view of easy realization of the operation. That is, when the bookcase has the approximately rectangular shape, referring to FIG. 6(*b*), the above operation may be realized by repetition of two operations of an operation of recording the books in the transverse direction and an operation of performing the book movement in the longitudinal direction orthogonal thereto. This is similarly applied to the case of FIG. 8(*b*) since the circumferential direction and the radial direction are orthogonal to each other. When the bookcase has the rectangular shape, the bookcase may be referred to as a rectangular region formed by a set of recorded books as a result of performing the book recording while scanning the position on the hologram recording medium using a predetermined axis and an axis orthogonal thereto. The predetermined axis and the orthogonal axis are axes on a plane parallel to the surface of the hologram recording medium 1.

Further, between adjacent books at a boundary of the bookcases, there is a characteristic that the book recording order is greatly changed. For example, in the case of FIG. 6(*b*) in Example 1, a book adjacent to the book 607 at the boundary of the bookcases corresponds to a book in an upper left end part of the bookcase 602 adjacent to the bookcase 601, which is a book recorded subsequent to the book 613 in the book recording order.

Further, in the above-described examples, the size of the bookcases is not particularly limited. When applying the invention, the bookcases that are present on the hologram recording medium may have the same size, or may have different sizes.

In the above-describe examples, the relationship of the pre-cure region, the bookcase, and the post-cure region, the book arrangement method of in each region, the recording order in each region, and the like are described as an example, but the invention is not limited to the above-described examples, and as a result, various modification examples may be considered.

In the above-described examples, the bookcase recording is performed with respect to each bookcase immediately after each bookcase is pre-cured, and then, the operation of repeating the bookcase recording N times is performed. For example, in the case of FIG. 6(a) in Example 1, the operation of performing the bookcase recording with respect to the region 601 immediately after pre-curing the region 601 and performing the bookcase recording with respect to the region 602 immediately after pre-curing the pre-cure the region 602 is performed, but the order of the pre-curing and the bookcase recording may be different from the above description.

For example, the following operation may be performed. The region 601 is pre-cured, the region 602 is then pre-cured, the bookcase recording with respect to the region 601 is then performed, and thereafter, the bookcase recording with respect to the region 602 is performed. That is, the two bookcases 601 and 602 are pre-cured, and then, the bookcase is performed in the order of the two bookcases 601 and 602, which means that the pre-curing and the bookcase recording are performed in the unit of two bookcases. The process of performing the pre-curing and the bookcase recording every two bookcases is repeated N/2 times. Through this operation, the first problem to the third problem can be similarly solved.

As understood the above description, it is not necessary that a region where the pre-curing is performed by one pre-curing process be different from a region where the post-curing performed by one post-curing process. For example, in Example 1, the region where the pre-curing is performed by one pre-curing process is a single bookcase (for example, region 601), and the region where the post-curing is performed by one post-curing process is a region of N times thereof (region 604). However, as described above, the operation of performing the pre-curing in the order of 601, 602, ..., and 603, covering and recording the books in the order of 601, 602, ..., and 603, and then, performing the post-curing in the order of 601, 602, ..., and 603 may be performed. In this case, the region where the pre-curing is performed by one pre-curing process is not a single bookcase and becomes the region 604 that corresponds to the region of N times thereof, which is the same as the region where the post-curing is performed by one post-curing process. Through this operation, the first problem to the third problem can be similarly solved. Here, as described above, when the pre-curing region is excessively large, a problem may occur. Accordingly, it is necessary to consider this problem in selection of the numerical value N that affects the area of the pre-cure region.

Further, a method for realizing the irradiation of the light beam onto a single pre-cure region (for example, region 601) by the cure optical system is not particularly limited. For example, a configuration in which the entire pre-cure region is uniformly irradiated with the light beam so that the entire pre-cure region is pre-cured by one-time irradiation of the light beam may be used. Alternatively, a configuration in which an irradiation range of the light beam is smaller than the pre-cure region, the pre-cure region is divided into plural regions, and the irradiation position of the light beam is moved to each divided region to perform the pre-curing may be used. This configuration may be similarly applied to the post-curing.

Furthermore, in the above-described examples, it is assumed that the bookcase and the pre-cure region are the same. However, it is not necessary that the bookcase and the pre-cure region be the same. That is, in the above-described examples, the operation of performing the book movement and the book recording so that the inside of the pre-cure region is covered by the books, but the section (that is, the bookcase) of the book movement may not be correlated with the region where the pre-curing or the post-curing is performed.

Figure 11A:
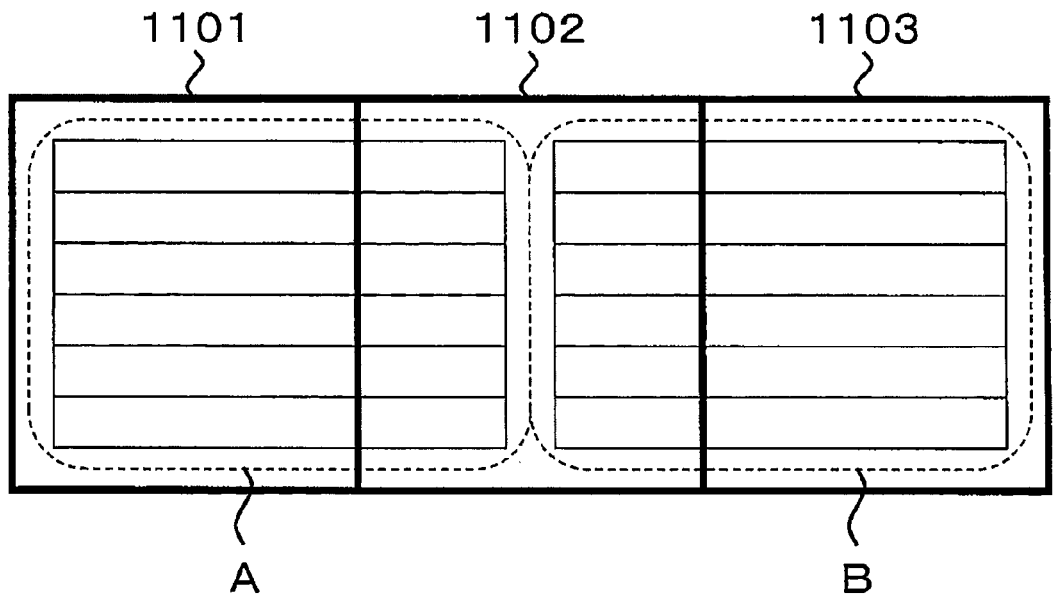
FIG. 11(a) is a diagram illustrating a modification example of the invention.

A modification example in this case will be described with reference to FIG. 11(a). Three regions 1101, 1102, and 1103 in FIG. 11(a) represent adjacent pre-cure regions. Further, a horizontally long rectangle drawn inside a broken line section indicated by A or B in FIG. 11(a) represents that books are laterally continuous in a row. As the modification example, as shown in FIG. 11(a), a section (a location where the book recording in the horizontal direction is stopped to transition to the next row) of book movement having a length of one and a half times the lateral width of a single pre-cure region may be set for the three adjacent pre-cure regions 1101, 1102, and 1103. In the case of FIG. 11(a), the same effects can be obtained by an operation of pre-curing the entire three pre-cure regions, sequentially performing the recording with respect to the books of a portion indicated by A in FIG. 11(a) and the books of a portion indicated by B in FIG. 11(a), and then, performing the post-curing in the order of 1101, 1102, and 1103.

Furthermore, in the above-described examples, the operation of performing the bookcase recording with respect to the adjacent bookcase after the bookcase recording is performed and before the dark reaction time of the books in the bookcase elapses. However, the region where the hologram is recorded after the bookcase recording is performed and before the dark reaction time in the bookcase elapses does not necessarily correspond to the section of the bookcases.

Figure 11B:
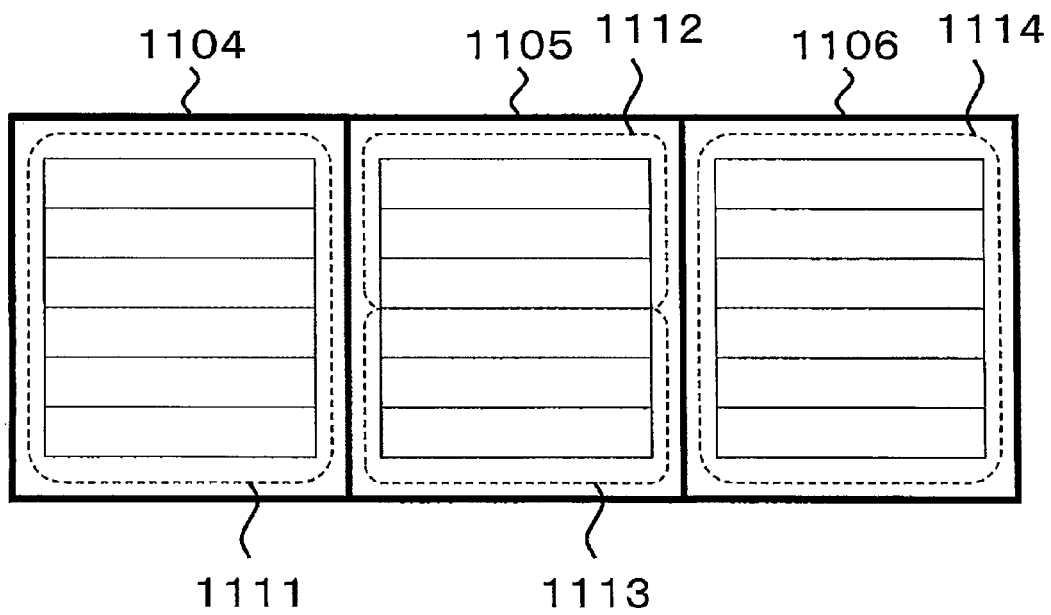
FIG. 11(b) is a diagram illustrating a modification example of the invention.

A modification example in this case will be described with reference to FIG. 11(b). Three regions 1104, 1105, and 1106 in FIG. 11(b) represent adjacent pre-cure regions. Further, similar to FIG. 11(a), a horizontally long rectangle drawn inside a broken line section represents that books are laterally continuous in a row. Broken line sections 1111 to 1114 represent a set of books, and the size of numerical values of signs attached to the broken line sections corresponds to the order of recording. As the modification example, in FIG. 11(b), first, the regions 1104 and 1105 are pre-cured, book recording in the regions of the broken line sections 1111 and 1112 is performed, and then, the region 1104 is post-cured. Then, the region 1106 is pre-cured, and book recording in the regions of the broken line sections 1113 and 1114 is performed, the region 1105 is post-cured, and subsequently, the region 1106 is post-cured.

In this case, the same effects can be obtained. Here, it is assumed that the dark reaction time of the books in the broken line section 1111 elapses at a time point when the book recording in the region of the broken line section 1112 is completed, and it is assumed that the dark reaction time of the region 1106 elapses at a time point when the post-cure with respect to the region 1105 is completed. Since it is possible to lengthen the recording time of the books in the region of the broken line section 1112 by enlarging the size of the bookcase, it is possible to employ such a configuration according to design of the size of the bookcase.

Here, since the covering unit of the books is defined as the bookcase, the covering unit (bookcase) of the books in FIG. 11(b) corresponds to the broken line section 1111, for example. Thus, the set of the books included in a combined region of the broken line section 1112 and the broken line section 1113 may be considered as a bookcase that is a region having the same size as that of the broken line section 1111. The region where the hologram is recorded before the dark reaction time of the bookcase of the broken line section 1111 elapses corresponds to all books in the combined region of the broken line section 1112 and the broken line section 1113.

However, as described herein, the region where the hologram is recorded before the dark reaction time of the bookcase of the broken line section 1111 elapses may be apart of adjacent bookcases, that is, only the region indicated by the broken line section 1112.

Further, as understood from the modification example, it is not necessary that the region where the post-curing process is continuously performed do not correspond to all regions where the recording is completed and the post-curing is not performed. In this modification example, the region where the recording is completed and the post-curing is not performed at a timing when the region 1104 is post-cured corresponds to the broken line sections 1111 and 1112, but the post-curing is performed with respect to only the broken line section 1111. In the above-described examples, for ease of description, a configuration in which the post-curing is performed with respect to the region where the recording is completed and the post-curing is not performed is described, but the invention is not limited thereto.

In consideration of the above-described modification examples, the most basic configuration relating to the invention is a configuration in which when the covering unit of the books is defined as the bookcase (for example, corresponding to A or B in the case of FIG. 11), the covering and recording of the books with respect to the first bookcase is finished and the book recording is performed in a region different from the first bookcase before the post-curing with respect to the first bookcase is performed. Here, the region different from the first bookcase may not necessarily correspond to the section of the bookcase.

If the dark reaction time of the books in the first bookcase elapses while the book recording is performed in the region different from the first bookcase, the post-curing with respect to the first bookcase is continuously performed, thereby making it possible to realize appropriate recording. That is, the most basic advantage of the invention is that the books in the different region are recorded while waiting for the dark reaction time after the recording of the first bookcase to thereby make it possible to achieve appropriate recording. One reason for the appropriateness is that the book recording can be continuously performed without occurrence of the waiting time of the dark reaction time. Thus, as described above, it can be said that the most basic configuration relating to the invention is the configuration in which the waiting time is allocated to the operation of recording the books in the different region in consideration of the dark reaction time of the first bookcase.

Thus, within the above-mentioned time, the operation of covering and recording the books with respect to a bookcase (for example, region 602 in FIG. 6(*a*) different from the first bookcase (for example, region 601 in FIG. 6(*a*)) may be performed. Here, as described in the examples, the recording unit within the time becomes the bookcase, which leads in an embodiment for easily realizing simple management.

Figure 5:
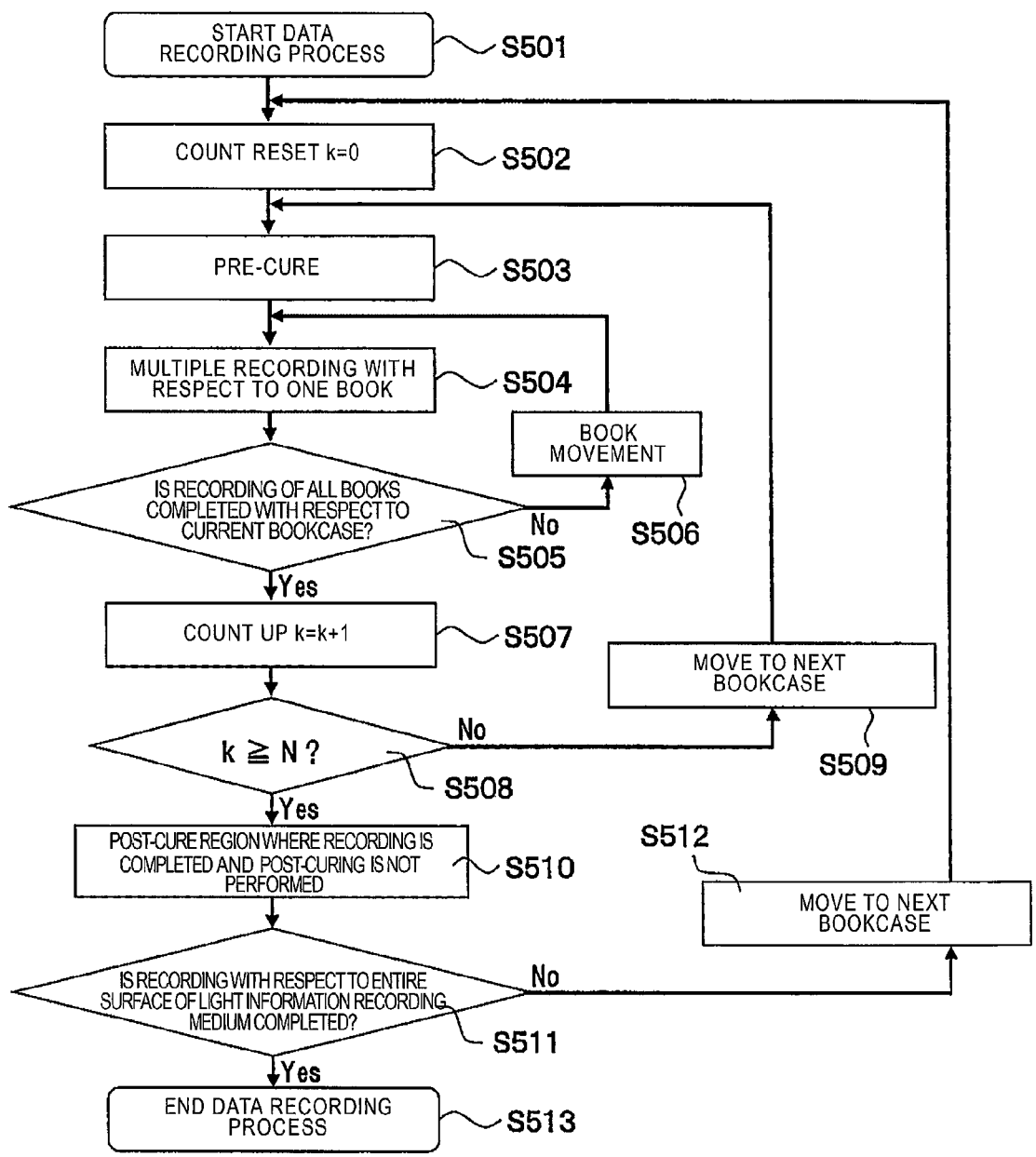
FIG. 5 is a processing flow of a data recording process in Example 1.

In the flowchart, referring to FIG. 5 related to Example 1, "the covering and recording of the books in the first bookcase is finished" corresponds to a case where when step S504 to step S506 are performed, the result is initially Yes in step S05. Further, "the post-curing is performed with respect to the first bookcase" corresponds to a case where step S510 is executed. Accordingly, when applying the above-described most basic configuration relating to the invention to Example 1, a configuration is obtained in which the determination result in step S05 initially becomes Yes, the covering and recording of the books with respect to the first bookcase (region 601 in FIG. 6(*a*)) is finished, and then, the book recording is performed with respect to the region different from the first bookcase within the time up to step S510 of performing the post-curing with respect to the first bookcase. In the case of Example 1, "the region different from the first bookcase" corresponds to N−1 bookcase regions (region 602, . . . , and region 604 in FIG. 6(*a*)) that is a target of the movement in step S509. Further, the book recording with respect to the region is performed by step S504 to step S506 executed again after returning to step S03 through step S09.

In the present specification, the covering unit of the books is defined as the bookcase, and the operation of covering and recording books with respect to the bookcase is referred to as the bookcase recording. When describing the bookcase recording without use of the expression of the bookcase, the bookcase recording may be expressed as an operation of performing hologram recording while changing the recording position so that the inside of a predetermined region is in a state where holograms in which information is recorded are arranged at a predetermined interval. Therefore, the process of performing bookcase recording may be referred to as a region recording process.

Here, a preferable characteristic relating to the size of the bookcase in the invention will be described. It is preferable that the longitudinal length of the bookcase (604 in FIG. 6) be larger than two times the longitudinal length of the book (for example, 605 in FIG. 6) and the lateral length of the bookcase be larger than two times the lateral length of the book. In other words, it is preferable that the size of the bookcase be equal to or greater than 2×2 of the size of the book. When the size of the bookcase satisfies the above size, the size of the pre-cure region or the post-cure region is also set to be equal to or greater than 2×2 of the size of the book.

According to the above-described configuration of the size of the bookcase, three effects are achieved. The first effect is that it is easy to configure the cure optical system 13 that generates the light for pre-curing. This is because as an aspect ratio of a region irradiated with the light for pre-curing increases (for example, when the longitudinal length is one book and the lateral length is 20 books), for example, it is difficult to design the optical system. Further, the second effect is that since a large region can be simultaneously pre-cured, it is possible to reduce total recording time. Further, the third effect is that the above-mentioned problem as the "third problem" can be solved. This is because as the length and the width of the post-cure region increase, the total number of books where dummy information to be covered in the vicinity thereof is recorded can be reduced. In this way, the first effect contributes to easy design of the optical system, the second effect contributes to reduction of the recording time, and the third effect contributes to improvement of the recording capacity. Accordingly, when generally considering the above effects, it is preferable that the size of the bookcase be equal to or greater than 2×2 of the size of the book.

In the related art example disclosed in PTL 2, a configuration in which recording and fixing are performed at the same time is disclosed. However, in the configuration disclosed in PTL 2, holograms are recorded on a concentric circle called a "track", and post-curing is performed along the track. That is, a distance between the tracks corresponds to the length of the lateral side of the "book" expressed in the present examples, and one side of a region where the post-curing is once performed in PTL 2 is equal to the length of the longitudinal side of the "book" expressed in the present examples. Accordingly, in the configuration in PTL 2, the post-cure region cannot be equal to or greater than 2×2 of the size of the book, so that the above-described three effects cannot be obtained.

Further, a common characteristic of the invention is that any modification example includes the operation continuously post-curing a region larger than the bookcase. For example, in FIG. 11(b) that shows a modification example, in the second post-curing, the post-curing is performed with respect to the region 1106 subsequent to the region 1105, and thus, the region where the post-curing is continuously performed is larger than the bookcase. Further, when considering easy realization, as described in the examples, it is preferable to employ a configuration in which the post-cure region is a set of plural bookcases.

Further, when considering the most basic configuration relating to the invention, the pre-curing process may not be necessarily performed, but by performing the pre-curing process, it is possible to improve the quality of recording.

The invention is not limited to the above-described examples, and includes various modification examples in addition to the above-described modification examples. For example, the examples are described in detail for easy understanding of the invention, and thus, all the described configurations may not be necessarily provided. Further, a part of the configurations of any example may be replaced with a configuration of another example, or a configuration of any example may be added to a configuration of another example. In addition, with respect to a part of the configurations of any example, addition, omission or replacement of a configuration of another example may be made.

Further, some or all of the respective configurations, functions, processing units, processing means or the like described above may be realized by hardware by being designed as an integrated circuit, for example. In addition, the respective configurations, functions or the like described above may be realized by software by interpreting and executing a program for realizing the respective functions by a processor. Information such as the program, tables or files for realizing the respective functions may be stored in a recording device such as a memory, a hard disk or a solid state drive (SSD), or in a recording medium such as an IC card, an SD card or a DVD.

Further, the control lines or the information lines are shown for the necessity of description, and thus, all of the control lines or the information lines are not necessarily provided in a product. In reality, it can be considered that almost all the components are connected to each other.

REFERENCE SIGNS LIST

1 HOLOGRAM RECORDING MEDIUM
2 HOLOGRAM RECORDING MEDIUM
10 HOLOGRAM RECORDING/REPRODUCING DEVICE
11 PICKUP
12 REPRODUCTION REFERENCE LIGHT OPTICAL SYSTEM
13 CURE OPTICAL SYSTEM
14 DISK ROTATION ANGLE DETECTION OPTICAL SYSTEM
50 MEDIUM TRANSPORT UNIT
51 ROTATING MOTOR
52 RADIAL TRANSPORT UNIT
81 MEDIUM TRANSPORT CONTROL CIRCUIT
82 LIGHT SOURCE DRIVE CIRCUIT
83 SERVO SIGNAL GENERATION CIRCUIT
84 SERVO CONTROL CIRCUIT
85 SIGNAL PROCESSING CIRCUIT
86 SIGNAL GENERATION CIRCUIT
87 SHUTTER CONTROL CIRCUIT
88 MEDIUM TRANSPORT CONTROL UNIT
89 CONTROLLER
90 INPUT/OUTPUT CONTROL CIRCUIT
91 EXTERNAL CONTROL DEVICE
92 ROTATING MOTOR CONTROL CIRCUIT
93 RADIAL TRANSPORT CONTROL CIRCUIT
201 LIGHT SOURCE
203 SHUTTER
206 SIGNAL LIGHT
207 REFERENCE LIGHT
212 SPACE LIGHT MODULATOR
214 SPACE FILTER
215 OBJECTIVE LENS
220 ACTUATOR
223 ACTUATOR
224 MIRROR
225 LIGHT DETECTOR

The invention claimed is:

1. A hologram recording device that irradiates a hologram recording medium with signal light and reference light to perform information recording, the hologram recording device comprising:
    recording position change means for changing an irradiation position of the signal light and the reference light to change a recording position on the hologram recording medium;
    region recording means for performing a region recording process of arranging holograms in which information is recorded at a predetermined interval in a predetermined region on the hologram recording medium by changing the recording position using the recording position change means and by controlling the irradiation of the signal light and the reference light; and
    post-curing means for performing a post-curing process of irradiating a region where the information recording is completed with a predetermined light beam,
    wherein within a time from the time when the region recording means performs a first region recording process with respect to a first predetermined region of the hologram recording medium to the time when the post-curing means performs the post-curing process with respect to the first predetermined region, the signal light and the reference light are applied onto a region different from the first predetermined region to perform the information recording, and
    wherein a hologram in which dummy information is recorded is disposed and recorded at a predetermined width between regions where the post-curing means continuously performs the post-curing process.

2. A hologram recording device that irradiates a hologram recording medium with signal light and reference light to perform information recording, the hologram recording device comprising:
    recording position change means for changing an irradiation position of the signal light and the reference light to change a recording position on the hologram recording medium;
    region recording means for performing a region recording process of arranging holograms in which information is recorded at a predetermined interval in a predetermined region on the hologram recording medium by changing the recording position using the recording position change means and by controlling the irradiation of the signal light and the reference light; and
    post-curing means for performing a post-curing process of irradiating a region where the information recording is completed with a predetermined light beam,
    wherein within a time from the time when the region recording means performs a first region recording process with respect to a first predetermined region of the hologram recording medium to the time when the post-curing means performs the post-curing process with respect to the first predetermined region, the region recording process with respect to a region different from the first predetermined region is performed at least once, and wherein a hologram in which dummy information is recorded is disposed and recorded at a predetermined width between regions where the post-curing means continuously performs the post-curing process.

3. The hologram recording device according to claim 1, wherein the predetermined region in which the holograms are arranged at the predetermined interval by the region recording means forms an approximately rectangular shape in which two or more holograms are arranged in a predetermined direction and two or more holograms are arranged in a direction perpendicular to the predetermined direction.

4. The hologram recording device according to claim 1, wherein the region recording process with respect to the region different from the first predetermined region is performed at least once within the time, wherein the post-curing means continues the post-curing process with respect to the first predetermined region, and wherein the post-curing process with respect to the region where the region recording process is performed is performed within the time.

5. The hologram recording device according to claim 1, wherein after the region recording process is sequentially performed with respect to the plurality of predetermined regions, the post-curing means performs the post-curing process in an order in which the region recording process is performed with respect to the plurality of predetermined regions.

6. The hologram recording device according to claim 2, wherein the region where the region recording process is performed within the time is adjacent to the first predetermined region.

7. The hologram recording device according to claim 2, wherein the post-curing means performs the post-curing process with respect to at least a part of the region where the region recording process is performed within the time, subsequent to the post-curing process with respect to the first predetermined region.

8. The hologram recording device according to claim 2, wherein the recording position change means includes rotation means for rotating the hologram recording medium and radial transport means for transporting the hologram recording medium in a radial direction perpendicular to a rotation direction of the rotation means, and wherein a movement direction from the first predetermined region to a second predetermined region where the region recording process is to be performed immediately after the recording process with respect to the first region coincides with a direction where the recording position is movable from the first predetermined region by the rotation means.

9. The hologram recording device according to claim 2, wherein the recording position change means includes at least two driving means, and wherein a movement direction from the first predetermined region to a second predetermined region where the region recording process is to be performed immediately after the first region recording process coincides with a direction where the recording position is movable by the driving means having a highest driving frequency in the region recording process.

10. The hologram recording device according to claim 2, wherein the region where the post-curing means continuously performs the post-curing process is wider than the region where the region recording process is performed.

11. The hologram recording device according to claim 2, wherein the region where the post-curing means continuously performs the post-curing process is a set of the regions where the region recording process is performed before the post-curing process.

12. The hologram recording device according to claim 2, wherein the post-curing means performs a series of operations of performing the post-curing process with respect to the plurality of predetermined regions after the region recording process is sequentially performed with respect to the plurality of predetermined regions, wherein the series of operations are repeated to perform the information recording with respect to the hologram recording medium, wherein a hologram in which dummy information is recorded is recorded between the regions where the post-curing process is performed, and wherein the hologram in which the dummy information is recorded is not recorded between the plurality of predetermined regions where the region recording process is performed in the series of operations.

13. The hologram recording device according to claim 2, wherein the light beam irradiated in the post-curing process has a low coherence compared with the signal light and the reference light.

14. The hologram recording device according to claim 2, further comprising:

pre-curing means for performing a pre-curing process of irradiating a region where the information recording is not performed with a predetermined light beam, wherein an optical system that generates the light beam irradiated in the pre-curing process is the same as an optical system that generates the light beam irradiated in the post-curing process.

15. A hologram recording method for irradiating a hologram recording medium with signal light and reference light to perform information recording, the hologram recording method comprising:

performing hologram recording while controlling an irradiation position and an irradiation time of the signal light and the reference light, and arranging holograms in which information is recorded at a predetermined interval in a first predetermined region of the hologram recording medium;

irradiating a region different from the first predetermined region with the signal light and the reference light to record the information;

performing a post-curing process of irradiating the first predetermined region with a predetermined light beam; and disposing and recording a hologram in which dummy information is recorded at a predetermined width between regions where the post-curing process is continuously performed.

16. A hologram recording method for irradiating a hologram recording medium with signal light and reference light to perform information recording, the hologram recording method comprising:

performing hologram recording while controlling an irradiation position and an irradiation time of the signal light and the reference light, and arranging holograms in which information is recorded at a predetermined interval in a first predetermined region of the hologram recording medium;
performing the region recording process with respect to a region different from the first predetermined region at least once;
performing a post-curing process with respect to the first predetermined region; and
disposing and recording a hologram in which dummy information is recorded at a predetermined width between regions where the post-curing process is continuously performed.

17. The hologram recording method according to claim 15, further comprising:
repeating, a plurality of times, the performing the hologram recording while controlling the irradiation position and the irradiation time of the signal light and the reference light, and arranging the holograms in which the information is recorded at the predetermined interval in the first predetermined region of the hologram recording medium; and
performing the post-curing process with respect to the plurality of regions where the information is recorded by the plurality of times of repetition, in an order in which the repetition is performed.

* * * * *